US012719286B2

(12) United States Patent
Freijedo Fernández

(10) Patent No.: US 12,719,286 B2
(45) Date of Patent: Aug. 25, 2026

(54) TECHNIQUES FOR CONTROLLING A POWER ELECTRONICS CONVERTER IN AN ELECTRIC DISTRIBUTION GRID

(71) Applicant: HUAWEI TECHNOLOGIES CO., LTD., Shenzhen (CN)

(72) Inventor: Francisco Daniel Freijedo Fernández, Nuremberg (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 518 days.

(21) Appl. No.: 18/347,381

(22) Filed: Jul. 5, 2023

(65) Prior Publication Data

US 2023/0344240 A1 Oct. 26, 2023

Related U.S. Application Data

(63) Continuation of application No. PCT/EP2021/050072, filed on Jan. 5, 2021.

(51) Int. Cl.
*H02J 3/38* (2026.01)
*H02J 3/388* (2026.01)
(Continued)

(52) U.S. Cl.
CPC .............. *H02J 3/381* (2013.01); *H02J 3/388* (2020.01); *H02M 1/007* (2021.05); *H02M 7/4835* (2021.05)

(58) Field of Classification Search
CPC .......... H02J 3/381; H02J 3/388; H02M 1/007; H02M 7/4835; H02M 1/0003; H02M 1/36
See application file for complete search history.

(56) References Cited

U.S. PATENT DOCUMENTS 6,297,621 B1 10/2001 Hui et al.
6,459,599 B1 10/2002 Agirman et al.
(Continued)

FOREIGN PATENT DOCUMENTS

CN 109687459 A * 4/2019 ................ H02J 3/01
CN 112039123 A * 12/2020 ............ H02M 1/088

OTHER PUBLICATIONS

"A Physically Insightful Approach to the Design and Accuracy Assessment of Flux Observers for Field Oriented Induction Machine Drives", published by Patrick L. Jansen et al. in 1994, [online], retrieved from <https://ieeexplore.ieee.org/stamp/stamp.jsp?tp=&arnumber=273627> (Year: 1994).*
(Continued)

*Primary Examiner* — Charles Cai
(74) *Attorney, Agent, or Firm* — Leydig, Voit & Mayer, Ltd.

(57) ABSTRACT

The present disclosure relates to a controller for controlling a power electronics converter in an electric distribution grid for distributing electrical energy, wherein the controller is configured to determine a first estimate of a grid voltage based on a converter current of the power electronics that the power electronics converter is capable of receiving in a passive operation mode, determine an operation mode of the power electronics converter, and upon determining a transition state of the power electronics converter in which the power electronics converter is transiting from the passive operation mode into an active operation mode, the controller is configured to determine a second estimate of the grid voltage based on the determined first estimate of the grid voltage and a converter current of the power electronics converter being receivable by the power electronics converter in the transition state upon a basis of a closed control loop.

16 Claims, 14 Drawing Sheets

(51) Int. Cl.
*H02M 1/00* (2007.01)
*H02M 7/483* (2007.01)

(56) References Cited

U.S. PATENT DOCUMENTS

| | | | | |
|---|---|---|---|---|
| 7,271,562 | B2 | 9/2007 | Lee et al. | |
| 7,932,691 | B2 | 4/2011 | Son et al. | |
| 9,312,779 | B2 | 4/2016 | Liu et al. | |
| 10,454,366 | B1 | 10/2019 | Li et al. | |
| 2014/0204633 | A1 | 7/2014 | Khajehoddin et al. | |
| 2014/0321173 | A1* | 10/2014 | Jones | H02M 1/12 363/40 |
| 2016/0218639 | A1* | 7/2016 | Eren | H02M 7/797 |
| 2019/0115820 | A1 | 4/2019 | Fu et al. | |

OTHER PUBLICATIONS

Moeini et al., "A DC Link Sensor-Less Voltage Balancing Technique for Cascaded H-Bridge Multilevel Converters With Asymmetric Selective Harmonic Current Mitigation-PWM", IEEE Transactions on Power Electronics, vol. 33, No. 9, total i0 pages (Nov. 7, 2017).

Miskovic et al., "Robust Sensorless Control of Grid Connected Converters with LCL Line Filters Using Frequency Adaptive Observers as AC Voltage Estimators," 2016 IEEE Applied Power Electronics Conference and Exposition (APEC), XP032899079, total 8 pages, Institute of Electrical and Electronics Engineers, New York, New York (Mar. 20, 2016).

Saeed et al., "Energization and Start-Up of CHB Based Modular Three-Stage Solid State Transformers," IEEE Transactions on Industry Applications, vol. 54, total 9 pages, Institute of Electrical and Electronics Engineers, New York, New York (Jun. 7, 2018).

Miniböck et al., "Comparative Theoretical and Experimental Evaluation of Bridge Leg Topologies of a Three-Phase Three-Level Unity Power Factor Rectifier," IEEE 32nd Annual Power Electronics Specialists Conference, total 6 pages, Institute of Electrical and Electronics Engineers, New York, New York (Jun. 17, 2001).

Kolar et al., "VIENNA Rectifier II—A Novel Single-Stage High-Frequency Isolated Three-Phase PWM Rectifier System," IEEE Transactions of Industrial Electronics, vol. 46, No. 4, total 18 pages, Institute of Electrical and Electronics Engineers, New York, New York (Aug. 1999).

Jansen et al., "A Physically Insightful Approach to the Design and Accuracy Assessment of Flux Observers for Field Oriented Induction Machine Drives," IEEE Transactions of Industry Applications, vol. 30, No. 1, total 10 pages, Institute of Electrical and Electronics Engineers, New York, New York (Jan./Feb. 1994).

Miskovic et al., "Synchronous Frame and Resonant Adaptive Observers as Disturbance Estimators and their Applications in Power Electronics," IEEE Energy Conversion Congress and Exposition (ECCE), total 8 pages, Institute of Electrical and Electronics Engineers, New York, New York (Nov. 13, 2014).

Malinowski et al., "A Simple Voltage Sensorless Active Damping Scheme for Three-Phase PWM Converters with an LCL Filter," IEEE Transactions on Industrial Electronics, vol. 55, No. 4, total 5 pages, Institute of Electrical and Electronics Engineers, New York, New York (Apr. 2008).

Freijedo et al., "New Algorithm for Grid Synchronization Based on Fourier Series," European Conference on Power Electronics and Applications, total 6 pages, Institute of Electrical and Electronics Engineers, New York, New York (Sep. 2007).

Fernàndez, "Contributions to Grid-Synchronization Techniques for Power Electronic Converters," Electronic Technology Department, Vigo University, total 56 pages (Jun. 9, 2009).

Marks et al., "Predictive Transient-Following Control of Shunt and Series Active Power Filters," IEEE. Transactions On Power Electronics, vol. 17, No. 4, Institute of Electrical and Electronics. Engineers, USA, total 11 pages (Jul. 1, 2022).

* cited by examiner 400
m=1,2,...,M individual dc-link voltage controllers
401
422
421
423
PLL
402
308
426
427
425
Power to current
403
428
Current Control Loop
404
505
307
Duty Cycles
405
424
421
429
PWM
406

500
Grid-Voltage Estimator
m=1,2,..,M individual dc-link voltage controllers
PLL
Power to current
Current Control Loop
Duty Cycles
PWM
307
501
505
311
402
427
426
425
421
422
423
401
403
428
404
505
307
405
429
424
421
406

$i_a(kT)$ 307

820

$K_{est}(z)$ 821

$\hat{e}^{Off}_{g,a}(kT)$ 611*

822

$\hat{e}_{g,a}(kT)$ 811

$v^{ref}_a(kT)$ 505

$z^{-1}$ 823

824

$\frac{1}{\hat{Z}_c+\hat{Z}_g}(z)$ 825

826

1000

1100
AC voltage [kV]
10
5
0
-5
-10
0.28
0.29
0.3
0.31
0.32
0.33
0.34
0.35
0.36
Time [s]
meas.
estimation

1200

TECHNIQUES FOR CONTROLLING A POWER ELECTRONICS CONVERTER IN AN ELECTRIC DISTRIBUTION GRID

CROSS-REFERENCE TO RELATED APPLICATIONS

This application is a continuation of International Application No. PCT/EP2021/050072, filed on Jan. 5, 2021, the disclosure of which is hereby incorporated by reference in its entirety.

TECHNICAL FIELD

The present disclosure relates to the field of power conversion between medium voltage (MV) AC power grid and low voltage (LV) DC power grid, in particular, using Multi-Module Multi-Level topologies when interfacing MV AC power grids. The disclosure further relates to the field of Solid-State Transformer (SST) technology for use in data centers. In particular, the disclosure relates to sensor-less voltage synchronization and control for grid-connected converters.

BACKGROUND

In Solid State Transformer (SST) Technology, Multi-Module Multi-Level Topologies are usually utilized when interfacing Medium Voltage (MV) AC grids. Input Series Output Parallel (ISOP) topologies are a prevalent solution for a two-stage power conversion between a MV AC grid and a Low voltage (LV) DC grid. Classical control methods for ISOP systems use MV AC voltages sensors to synchronize with the MV AC grid. However, AC voltage sensors in MV systems are very expensive and can have failures which may reduce availability and reliability. The AC voltage acquisition system may be complex and highly bandwidth limited. In case of weak grids relying on sensor measurements, problems may arise due to grid distortion and potential instability problems.

SUMMARY

The present disclosure provides a solution for a power conversion between medium voltage AC power grid and low voltage DC power grid without the above described disadvantages. In particular, the disclosure provides a mechanism for power conversion between medium voltage AC power grid and low voltage DC power grid that requires a reduced number of voltage sensors or, in other words, that is able to work in an AC voltage sensor-less operation.

A basic idea of this disclosure is to provide for operation of the converter without a voltage sensor by using the information available from an off-PWM (Pulse Width Modulation) stage of the converter, usually known as a pre-charge stage, i.e. the state in which the converter is switched off or in a passive operation mode.

The idea is to combine an open loop estimation based on the unity power factor properties of the converter meanwhile the PWM operation and control are not enabled, i.e. in pre-charge state, with a closed-loop structure modified from the flux-observers widely deployed in motor drives state of the art. The key of the performance is the smooth transition when the power converter switching operation starts. This transition is usually associated to the instant at which closed loop control of the power converter starts.

In this disclosure, the following terms, abbreviations and notations will be used:

- LV low voltage, e.g. up to 1000V in AC
- MV medium voltage, e.g. between 1000V and 35 kV, in AC
- SST Solid-State Transformer
- ISOP Input Series Output Parallel
- PWM Pulse Width Modulation
- LFT Line Frequency Transformer
- CHB Cascaded H Bridge
- THD Total Harmonic Distortion
- UPFR Unity Power Factor Rectifier
- DC Direct Current
- AC Alternating Current
- IGBT Insulated Gate Bipolar Transistor
- MOSFET Metal-Oxide Semiconductor Field Effect Transistor In this disclosure, grids or electric grids, power grids or electronic distribution grids are considered. Such a grid is an interconnected network for delivering or distributing electricity from producers to consumers. It comprises generating stations that produce electric power, electrical substations for stepping electrical voltage up for transmission or down for distribution, high voltage transmission lines that carry power from distant sources to demand centers and distribution lines that connect individual customers.

Power electronics converters as described in this disclosure are applied for converting electric energy from one form to another, such as converting between AC and DC, e.g. between medium voltage AC and low voltage DC. Power converter can also change the voltage or frequency or some combination of these. One way of classifying power conversion systems is according to whether the input and output are AC or DC. Power electronics converter are based on power electronics switches that can be actively controlled by applying ON/OFF logic (i.e., PWM operation, usually commanded by a closed loop control algorithm).

A solid-state transformer (SST) or power electronic transformer (PET) as described in this disclosure is a type of power electronics converter that replaces a conventional transformer used in AC electric power distribution. It is more complex than a conventional transformer operating at utility frequency or line frequency, but it can be smaller and more efficient than a conventional transformer because it operates at high frequency. A solid-state transformer can actively regulate voltages, currents and power transferred between different electric systems. Some SST technology aims to convert single-phase power to three-phase power and vice versa. Some SST technology can input or output DC power to reduce the number of conversions, for greater end-to-end efficiency, etc.

SSTs are a power electronic based alternative to line-frequency transformers (LFTs). LFTs are classic elements of transmission and distribution to interface different voltage levels in AC grids. LFTs are cost effective, highly efficient at high loads and reliable. However, they suffer from several limitations, including voltage drop under high load, sensitivity to harmonics, load imbalances and DC offsets, no overload protection, and low efficiency when operating with light loads. On the other hand, SSTs are based on power electronics switches, sensors and intelligent controls, which enable advanced functionalities, such as, power flow control; reactive power, harmonics, and imbalances compensation; smart protection and ride-through capabilities. Furthermore, high switching frequency operation enables a significant reduction of the volume and weight. Some of these features combined may make SST advantageous when compared with classical LFTs, with explicit mention to key applications such as data centers.

This disclosure is focused on the power electronics interface with the AC high/medium voltage AC grid. Modular Multilevel Cascaded Converters are a prevalent solution to achieve the SST implementation.

A controller or controlling device as described in this disclosure is any device that can be utilized for regulation of voltage, currents or powers of a power electronics converter. A controller or controlling device can be a single micro-controller or processor or a multi-core processor or can include a set of micro-controllers or processors or can include means for controlling and/or processing. The controller can perform specific control tasks, for example controlling a converter, according to a software, hardware or firmware application.

According to a first aspect, the disclosure relates to a controller for controlling a power electronics converter in an electric distribution grid for distributing electrical energy, wherein the controller is configured to: —determine a first estimate of a grid voltage based on a converter current of the power electronics converter being receivable by the power electronics converter in a passive operation mode of the power electronics converter; —determine whether the power electronics converter is in an active or passive operation mode, and—wherein, upon determining a transition state of the power electronics converter in which the power electronics converter is transiting from the passive operation mode into the active operation mode, the controller is configured to determine a second estimate of the grid voltage based on the determined first estimate of the grid voltage and a converter current of the power electronics converter being receivable by the power electronics converter in the transition state upon a basis of a closed control loop.

The power electronics converter is in an active ON operation mode if power electronics switches and their regular firing logic (e.g., a PWM algorithm) are enabled; the power electronics converter is in a passive OFF operation mode if power electronics switches are disabled (e.g., during a pre-charge stage).

By using such a controller, a voltage sensor-less operation of the converter can be achieved by using the information available from the passive operation of the power electronics converter, usually known as the pre-charge stage of the converter.

By this combination of an open loop estimation in the passive operation mode with the closed loop operation of the converter a smooth transition can be achieved. I.e., the combination of the OFF and ON state of the converter makes the whole operation smooth, and this is what makes the controller very suitable for industrial operation.

The power electronics converter may be seen as a voltage source at its AC terminals (before the output filter).

An electric distribution grid as described in this disclosure is a power grid, e.g. a medium voltage AC power grid, for distributing electrical energy.

Such an electric distribution grid or simply abbreviated as "a grid" is an interconnected network for delivering or distributing electricity from producers to consumers. It comprises generating stations that produce electric power, electrical substations for stepping electrical voltage up for transmission or down for distribution, high voltage transmission lines that carry power from distant sources to demand centers and distribution lines that connect individual customers. The grid can have multiple phases, for example three phases as illustrated in FIG. 1.

A converter current as described in this disclosure is a current flowing in a grid-side terminal of the power electronics converter, e.g. a current $i_a(t)$ as illustrated in FIG. 3. The converter current can be defined per phase of the grid.

A grid voltage as described in this disclosure is a voltage in the grid or at a connection between converter and grid, e.g. a stiff grid voltage $e_{g,a}(t)$ as illustrated in FIG. 3 or a voltage $e_{c,a}(t)$ at the connecting point between the converter and the grid as illustrated in FIG. 3. The grid voltage can be defined per phase of the grid. The output voltage of the converter, $v_a(t)$ in FIG. 3 is set by the control algorithm that sets a PWM references (closed loop operation of the converter).

In an implementation of the power electronics converter, the power electronics converter is configured to: determine the first estimate of the grid voltage further based on a DC-link voltage of the power electronics converter in the passive operation mode of the power electronics converter.

In an ideal lossless three-phase converter, the DC-link voltage is proportional to the line-to-line peak voltage of the AC system. Similar relation exists in a single-phase case. This is why the DC-link voltage can be used as a good estimator of the grid-voltage amplitude (peak voltage).

The term "DC-link voltage" depends on the topology, e.g. DC-link of a module, aggregated DC-link for the converter, aggregated by phase, etc. In this disclosure, the term "DC-link voltage" refers to the voltage $v_{dc}(t)$ as shown in FIG. 3 of the IDF, i.e. the total DC-link voltage. In cascaded multilevel structures, it can be obtained as a sum of independent DC-link voltages of branch cells (c.f. FIG. 1).

In an implementation of the power electronics converter, the power electronics converter is configured to: determine the first estimate of the grid voltage further based on an oscillation with a predefined nominal frequency of the grid voltage.

In an implementation of the power electronics converter, the power electronics converter is configured to: determine the first estimate of the grid voltage further based on Fourier components of the converter current in the transition state.

This provides the advantage that by using the Fourier components of the converter current, a unitary vector that is in-phase with the AC current and hence, also the AC voltage, can be efficiently determined.

In an implementation of the power electronics converter, the power electronics converter is configured to: determine the first estimate of the grid voltage based on combining the Fourier components of the converter current with an oscillating signal with the predefined nominal frequency of the grid voltage as the oscillation frequency.

This provides the advantage that by combining the Fourier components of the converter current with an oscillating signal with the predefined nominal frequency of the grid voltage, a precise estimation of the in-phase unitary sinusoidal that represents the shape of the converter current can be precisely determined.

In an implementation of the power electronics converter, the power electronics converter is configured to determine the first estimate of the grid voltage based on: combining the Fourier components of the converter current with the oscillation signal with the predefined nominal frequency of the grid voltage as the oscillation frequency to obtain a unitary sinusoidal that is in-phase with the converter current; and multiplying the unitary sinusoidal with a DC-link voltage that well estimates the line-to-line AC voltage (in a three-phase system). In single-phase system, the half of the DC-link voltage well estimates the phase-to-neutral amplitude, which is properly considered in the AC-voltage reconstruction).

For a 3-phase system, the DC-link voltage provides a good estimation of the line-to-line voltage amplitude. The phase-to-neutral would be then line-to-line voltage divided by the square root of three (√3). For a single phase system, the phase to neutral voltage corresponds to the half of the DC-link voltage.

The term "DC-link voltage" depends on the topology, e.g. DC-link of a module, aggregated DC-link for the converter, aggregated by phase, etc. In this disclosure, the term "DC-link voltage" refers to the voltage $v_{dc}(t)$ as shown in FIG. 3, i.e. the total DC-link voltage. In cascaded multilevel structures, it can be obtained as a sum of independent DC-link voltages of branch cells, c.f. FIG. 1.

In a single-line system, the half of the DC-link total voltage is a good estimation for the amplitude of the phase-to-neutral amplitude, i.e. the amplitude of the phase-to-neutral voltage $v_a(t)$ as shown in FIG. 3. In a three-phase case, the total DC-link is a good estimation for the line to line amplitude. The phase-to-neutral voltage amplitude would be then the line-to-line voltage divided by the square root of three (√3). For the ISOP topologies, the DC-link total voltage 303 (per-phase) can be determined as the sum of all the individual DC-link voltages of the branch as shown in FIG. 1.

In an implementation of the power electronics converter, the power electronics converter is configured to: determine the second estimate of the grid voltage based on a value of a DC-link voltage in the transition state. Slight changes of this estimation, e.g. based on a slightly changed value of the DC-link voltage are possible, as well.

This provides the advantage that a smooth transition between OFF state and ON state, i.e. passive and active operation mode, of the power electronics converter can be achieved without discontinuities.

In an implementation of the power electronics converter, the power electronics converter is configured to: determine the second estimate of the grid voltage based on an unaltered version of the Fourier components of the converter current in the transition state.

This provides the advantage that by freezing (i.e. maintaining or keeping unchanged) the off-state estimation for Fourier components and DC-link voltage, a smooth transition from off state to on state can be achieved.

In an implementation of the power electronics converter, the power electronics converter is configured to: determine the second estimate of the grid voltage based on keeping the oscillation with the predefined nominal frequency of the grid voltage in the transition state. At some steady-state operation, the feedforward component can be smoothly removed from the second estimate. After the OFF-ON transition, and after reaching a steady-state, a smooth "disconnection" from the OFF-state transition can be implemented. Slight changes of this estimation, e.g. based on a slightly changed value of the oscillation or its nominal frequency are possible, as well.

In an implementation of the power electronics converter, the power electronics converter is configured to: use the first estimate of the grid voltage determined in the transition state as a feedforward signal into the closed control loop to enable a smooth transition between the passive operation mode and the active operation mode of the power electronics converter.

This provides the advantage that by providing the feedforward signal into the closed control loop a smooth transition between the passive operation mode and the active operation mode of the power electronics converter can be achieved.

In an implementation of the power electronics converter, the power electronics converter is configured to: determine the second estimate of the grid voltage based on the closed control loop using the first estimate of the grid voltage determined in the transition state and an AC output converter voltage reference being calculated by a current control loop of the power electronics converter.

In an implementation of the power electronics converter, the closed control loop is based on a predetermined transfer function of an impedance of an output filter of the power electronics converter and a predetermined transfer function of an impedance of the electric distribution grid.

In an implementation of the power electronics converter, the first estimate of the grid voltage and the second estimate of the grid voltage are estimates of a stiff grid voltage of a stiff grid model of the electric distribution grid or estimates of a grid voltage at a connection point between the stiff grid model and the power electronics converter.

The stiff grid model of the electric distribution grid is shown in FIG. 3. It can comprise the stiff grid voltage and the voltage at the connection point between the stiff grid model and the power electronics converter.

In an implementation of the power electronics converter, the power electronics converter comprises a plurality of branch cells configured for voltage source operation, wherein the DC-link voltage is based on a sum of DC-link voltages of the plurality of branch cells of the power electronics converter.

This provides the advantage that the AC voltage sensor-less operation can be applied in a CHB circuit, which is depicted in FIG. 1. On the other hand, it can be stressed the fact that multiple DC-link sensors that construct an aggregated DC-link voltage are less costly than a single AC medium voltage sensor.

In an implementation of the power electronics converter, the converter current is a converter current of a single phase power electronics converter; and the first estimate of the grid voltage and the second estimate of the grid voltage are estimates for the single phase power electronics converter.

According to a second aspect, the disclosure relates to a method for controlling a power electronics converter in an electric distribution grid for distributing electrical energy, wherein the method comprises: determining a first estimate of a grid voltage based on a converter current of the power electronics converter being receivable by the power electronics converter in a passive operation mode of the power electronics converter; determining whether the power electronics converter is in an active (ON) or passive (OFF) operation mode, and wherein, upon determining a transition state of the power electronics converter in which the power electronics converter is transiting from the passive OFF operation mode into the active ON operation mode, determining a second estimate of the grid voltage based on the determined first estimate of the grid voltage and a converter current of the power electronics converter being receivable by the power electronics converter in the transition state upon a basis of a closed control loop.

By using such a method, a voltage sensor-less operation of the converter can be achieved by using the information available from the passive OFF operation of the power electronics converter, usually known as the pre-charge stage of the converter.

By this combination of an open loop estimation in the passive OFF operation mode with the closed loop operation of the converter a smooth transition can be achieved. I.e., the combination of the OFF and ON state of the converter makes the whole operation smooth, and this is what makes the controller very suitable for industrial operation.

BRIEF DESCRIPTION OF THE DRAWINGS

Further embodiments will be described with respect to the following figures, in which.

DETAILED DESCRIPTION OF EMBODIMENTS

In the following detailed description, reference is made to the accompanying drawings, which form a part thereof, and in which is shown by way of illustration specific aspects in which the disclosure may be practiced. It is understood that other aspects may be utilized and structural or logical changes may be made without departing from the scope of the present disclosure. The following detailed description, therefore, is not to be taken in a limiting sense, and the scope of the present disclosure is defined by the appended claims.

It is understood that comments made in connection with a described method may also hold true for a corresponding device or system configured to perform the method and vice versa. For example, if a specific method step is described, a corresponding device may include a unit to perform the described method step, even if such unit is not explicitly described or illustrated in the figures. Further, it is understood that the features of the various aspects described herein may be combined with each other, unless specifically noted otherwise.

Figure 1:
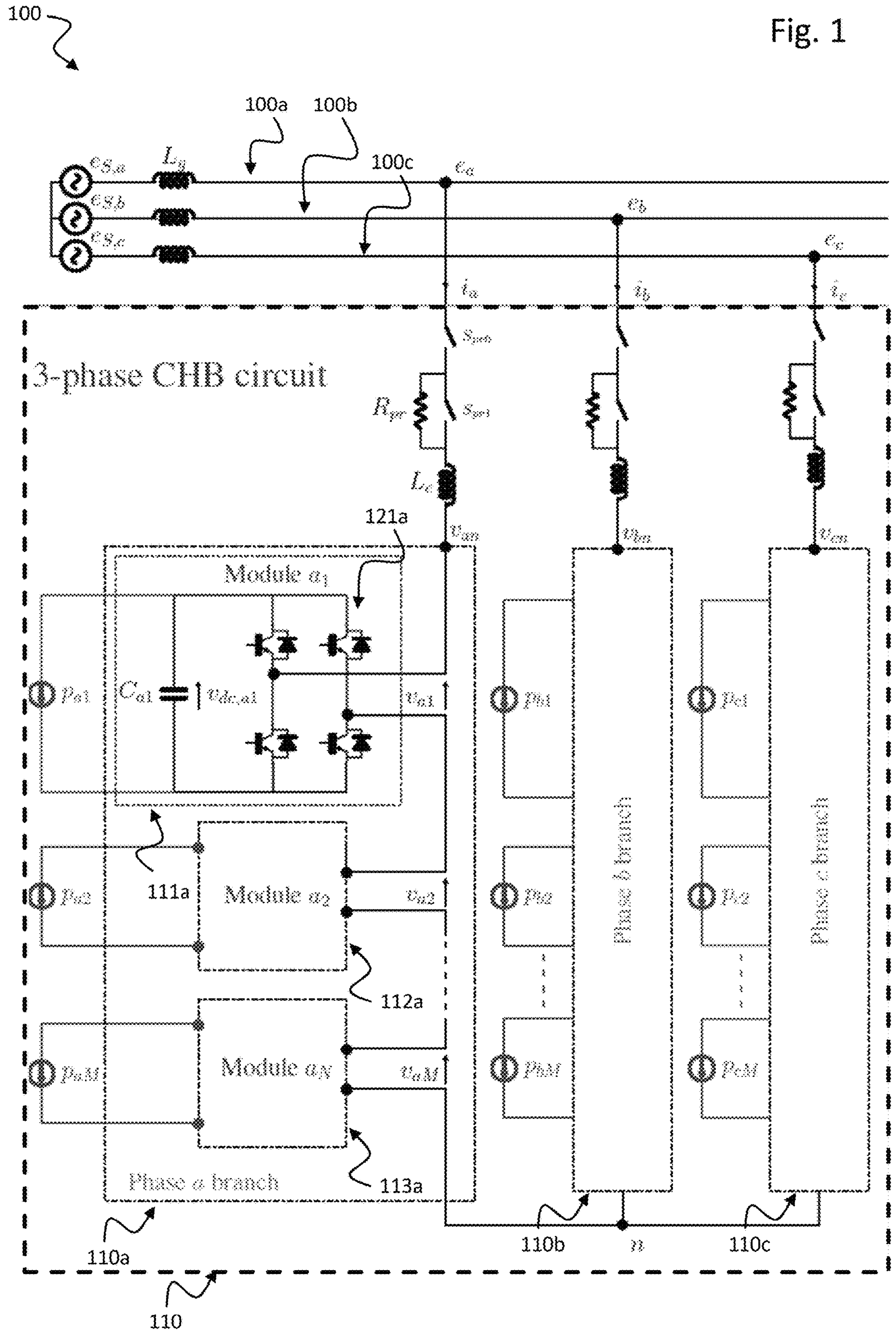
FIG. 1 shows a block diagram illustrating a four quadrant three-phase Cascaded H-Bridge (CHB) converter connected to a grid.

FIG. 1 shows a block diagram illustrating a four quadrant three-phase Cascaded H-Bridge (CHB) converter circuit 110 connected to a grid 100.

The AC output voltage is synthesized by the sum of modules 111*a*, 112*a*, 113*a* in the same branch 110*a*, i.e. by the sum of the voltages $v_{a1}$, $v_{a2}$, $v_{aM}$. This is made by a proper operation of the power electronics switches (e.g., IGBTs or MOSFETs) that connect/disconnect the DC-links, i.e. DC-link voltages $v_{dc,a1}$, etc. of the respective modules 111*a*, 112*a*, 113*a*, to the AC side via the turn on/off of the devices or modules 111*a*, 112*a*, 113*a*. For example, using a full-bridge inverter, the switching combinations for each module 111*a*, 112*a*, 113*a* set the AC output voltages to be $v_{dc}$, 0 or $-v_{dc}$ ($v_{dc,a1}$, 0 or $-v_{dc,a1}$ for the cells 121*a* of module 111*a* detailed in FIG. 1). The use of multiple modules 111*a*, 112*a*, 113*a* has the following advantages: i) the power electronics switches are suited for a low voltage class, which in practice allows to use low voltage power electronics technologies in high/medium voltage applications; ii) the power quality of the AC output voltage waveform increases with the number of modules 111*a*, 112*a*, 113*a*; more voltage levels implies less harmonics; iii) related to previous point, the output filter effort is reduced as the output harmonics are less and less significant.

The advantages of multilevel converters are at the cost of increasing the complexity; both in terms of topology and control. Focusing on control, the main challenge is to achieve a reliable and robust regulation of the DC-link voltages, despite there is a common and constrained path for branch currents.

The ISOP SST concept of FIG. 1 can be optimized for applications in which the power delivery is going on one direction. In that scenario, the four-quadrant cells 121*a* can be substituted by unity power factor PWM topologies as building blocks, such as the ones represented in FIG. 2.

Figure 2:
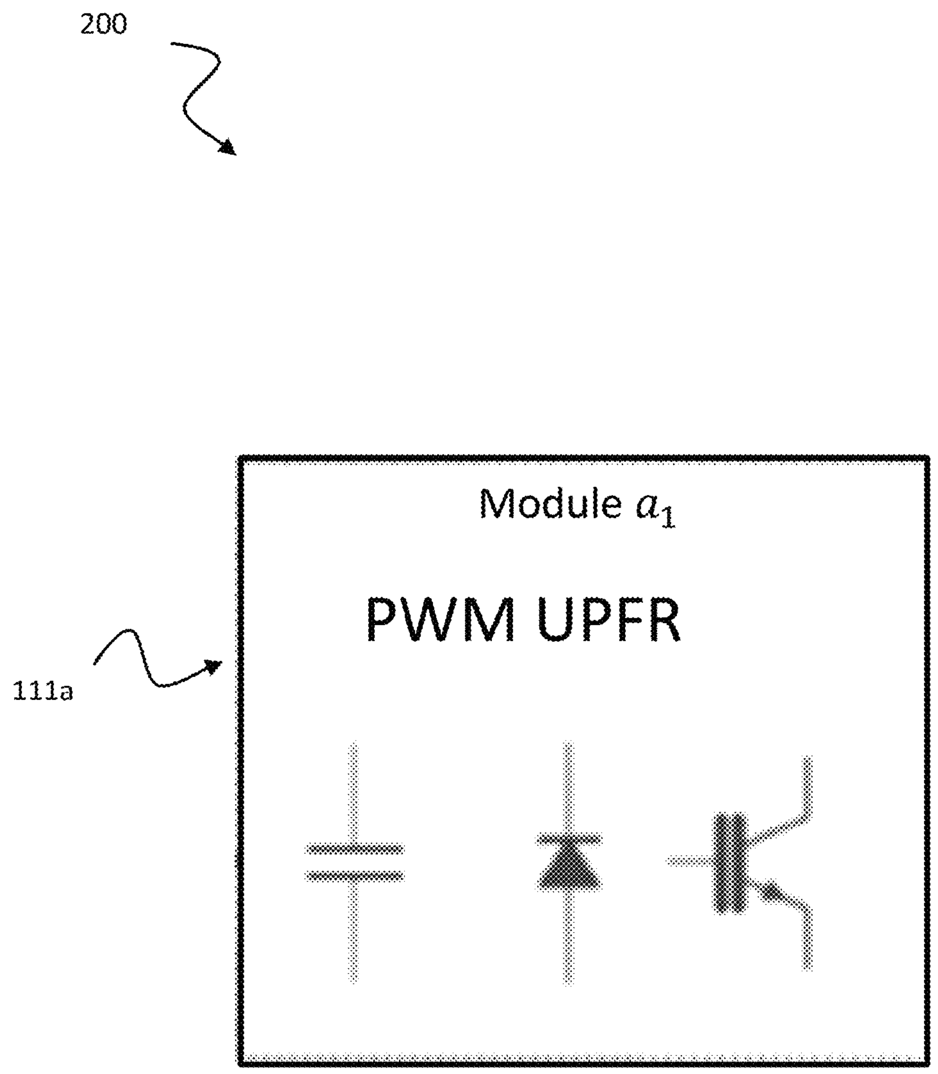
FIG. 2 shows a conceptual representation for an Unity Power Factor Rectifier (UPFR) as an alternative module building block for the Cascaded H-Bridge (CHB) converter of FIG. 1.

FIG. 2 shows a concept diagram of an Unity Power Factor Rectifier (UPFR) 200, which can be used as a basis for building blocks for the Cascaded H-Bridge (CHB) converter 110 of FIG. 1.

Key features of the UPFR based approach are the following: a) Power conversion is constrained to work with power factor equal to 1, assuming an ideal system without harmonics, only fundamental components, the AC current and the AC voltage are in-phase. b) Simple layout and high power density is achieved, e.g., diodes are simpler than active devices. c) High frequency PWM operation resulting in c.1) reduced size of magnetics and cost effective; and c.2) high power quality: low Total Harmonic Distortion THD, in output current and voltage in the point of connection are achievable. d) Vector control and PWM techniques, similar to the ones employed in four quadrants CHB, are suitable; see J. Minibock and J. W. Kolar, "Comparative Theoretical and Experimental Evaluation of Bridge Leg Topologies of a Three-phase Three-Level Unity Power Factor Rectifier", Proc. of the 32nd IEEE Power Electronics Specialist Conference (PESC), Vancouver (Canada), July, 2001.

Figure 3:
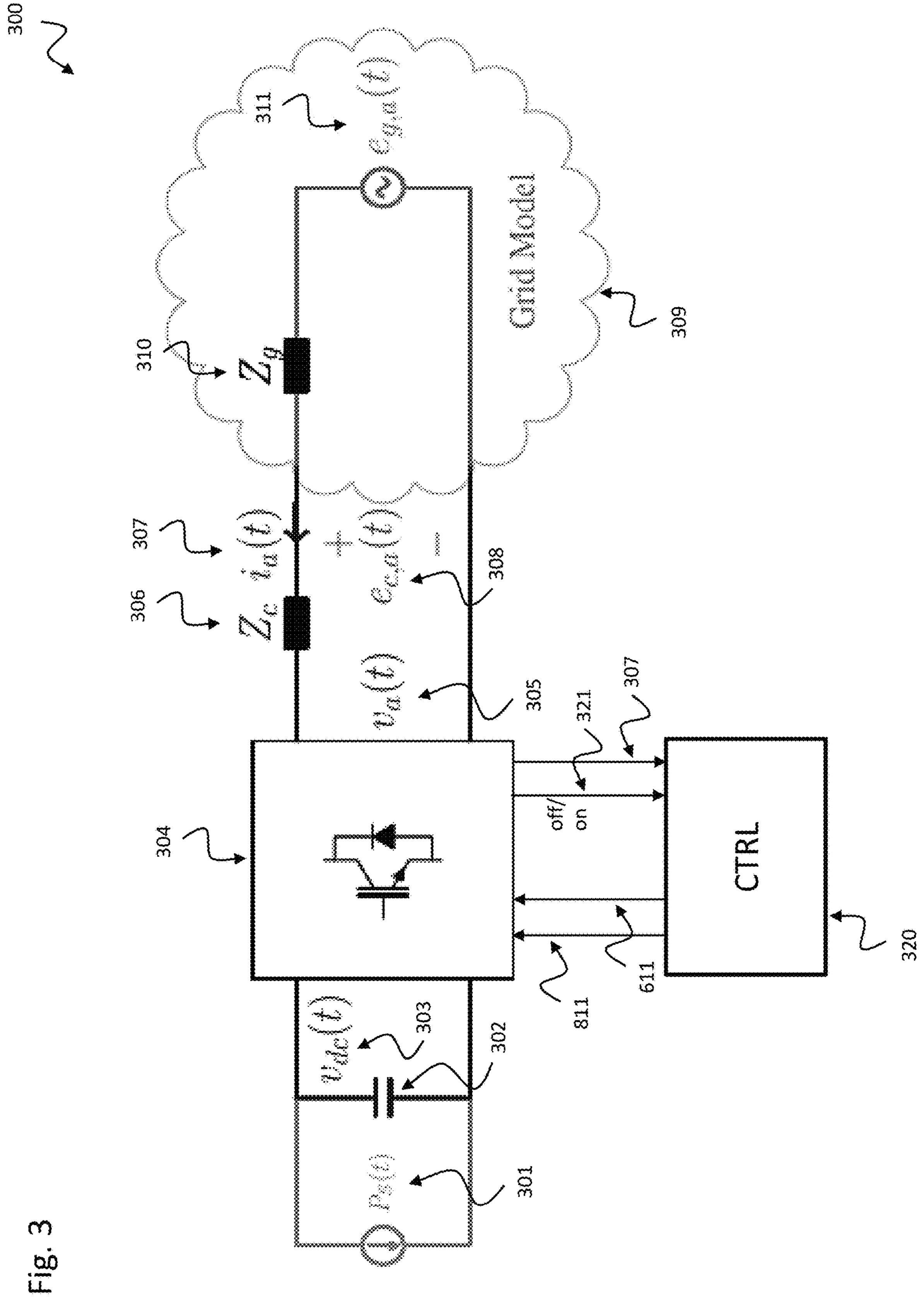
FIG. 3 shows a simplified single-line circuit diagram of a power electronics converter and a corresponding controller according to the disclosure.

FIG. 3 shows a simplified single-phase circuit diagram of a power electronics converter 304 and a corresponding controller 320 according to the disclosure. In particular, FIG. 3 shows the single-line representation of the system/circuit 300 under study in this disclosure. For simplicity reasons, a single-phase system is shown in FIG. 3, where subindex "a" is used for phase "a" according to the first phase 100*a* of the grid 100 shown in FIG. 1, but the concept can be extended for any number of phases and modules of the ISOP. The variables 308 and 311, i.e. stiff grid voltage 311 and voltage at the connection point between power electronics converter 304 and grid 309, represent the un-available measurements. The variables 303, 305 and 307, i.e. total DC-link voltage 303, output phase to neutral voltage 305 and converter current 307, represent the available variables to solve the problem.

The system variables and circuit components depicted in FIG. 3 are explained in the following.

- Ps(t) 301 represents the power consumption. This variable is not explicitly relevant in the algorithms, but it indirectly sets the fundamental current that draws into the system 300.
- $v_{dc}(t)$ 303 is the total DC-link voltage. In cascaded multilevel structures, as shown for examples in FIGS. 1 and 2 it can be obtained as a sum of independent DC-link voltages $v_{dc,a1}$ of branch cells 121*a* of the modules 111*a*, 112*a*, 113*a*.
- $v_a(t)$ 305 is the output phase to neutral voltage, which is the control variable in the current loop, e.g. current control loop 404 shown in FIGS. 4 and 5.
- $i_a(t)$ 307 represents the current that flows into the converter 304, also referred to as converter current 307.
- The stiff grid voltage $e_{g,a}(t)$ 311 is the Thevenin voltage of a grouped grid model 309. It is not necessarily a physical point.
- The grid impedance $Z_g$ 310 is also a part of the grid model representation 309; in most of the cases, it is a lumped representation of a quite complex system, not a single physical device. Arguably, it may be not known easily, but, as an outline parameter, usually, it can be predicted with a good accuracy (grid studies, knowledge of the installation). Assuming a linear approach, $Z_g$ 310 is defined in the frequency domain, i.e., $Z_g(\omega)$.
- The voltage at the connection point between converter 304 and grid 309 is $e_{c,a}(t)$ 308 which can be physically available by a sensor, but has the practical problems described before as motivation for concept of this disclosure.
- The output filter value $Z_c$ 306 is made of physical components (e.g. inductors) and can be well known (the converter designer sets it and the control algorithm is designed according on it). Assuming a linear approach, $Z_c$ 306 is also defined in the frequency domain, i.e., $Z_c(\omega)$.

As described above, a basic idea of this disclosure is to achieve voltage sensor-less operation of the converter 304 by using the information available from an OFF-PWM stage of the converter 304, usually known as pre-charge stage, i.e. the state in which the converter 304 is switched off or in a passive operation mode. The idea is to combine an open loop estimation based on the unity power factor properties of the converter 304 meanwhile the PWM operation and control are not enabled, i.e. in pre-charge state, with a closed-loop structure modified from the flux-observers widely reported in electric drives applications. The key of the performance is the smooth transition when the power converter switching operation starts. This transition is usually associated to closed loop control starting either (ON-state).

A voltage sensor-less operation of the converter 304 can be achieved by applying a controller 320 for controlling the power electronics converter 304 in the electric distribution grid 309 for distributing electrical energy as described in the following.

The controller 320 is configured to determine a first estimate 611 of a grid voltage, e.g. the stiff grid voltage 311 or the voltage 308 at the connection point, based on the converter current 307 of the power electronics converter 304 being receivable by the power electronics converter 304 in a passive operation mode of the power electronics converter 304.

Figure 8:
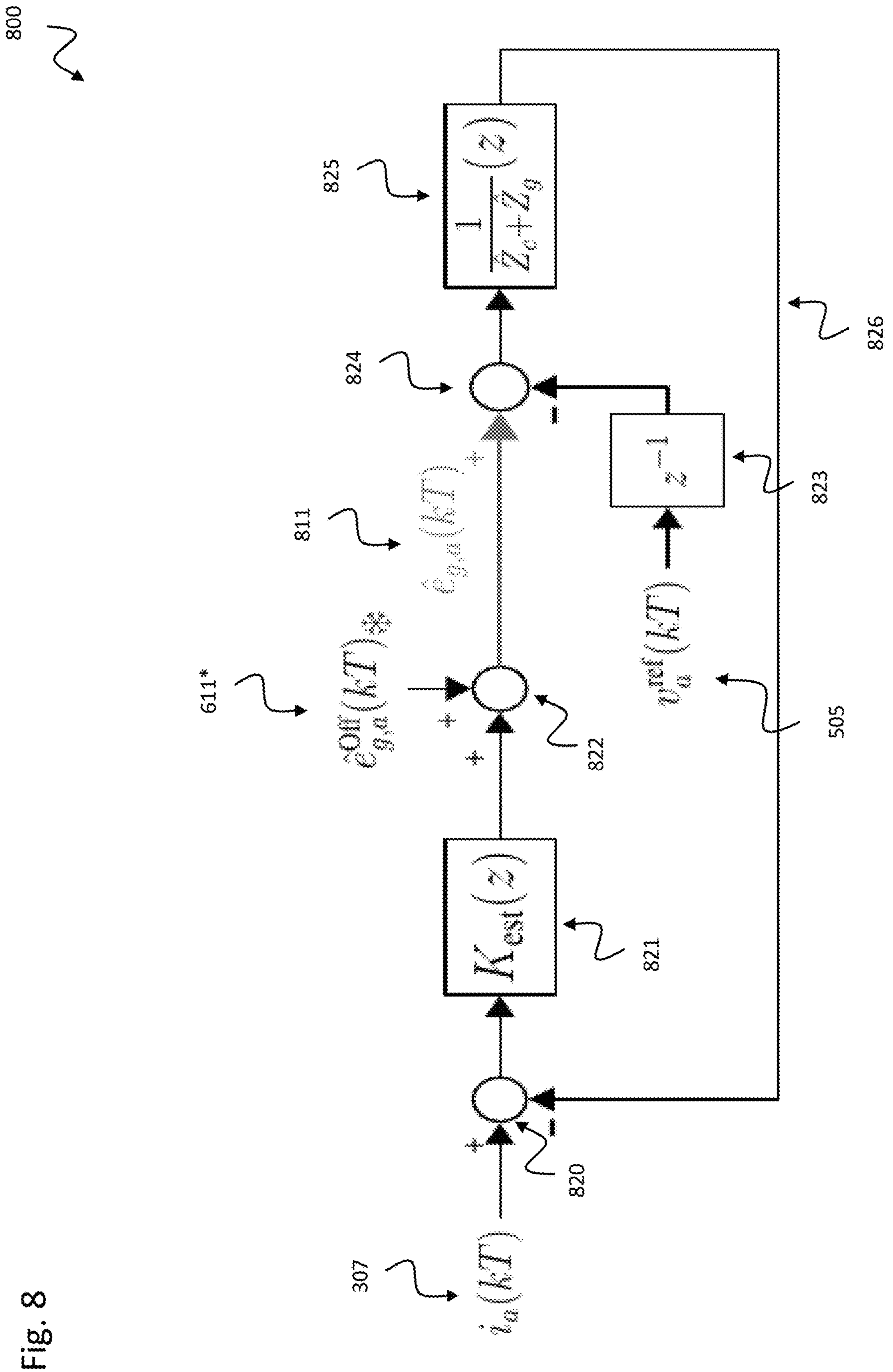
FIG. 8 shows a schematic diagram illustrating a third stage of a controller controlling a power electronics converter according to the disclosure.

The controller 320 is configured to determine whether the power electronics converter 304 is in an active or passive operation mode. Wherein, upon determining a transition state 321 of the power electronics converter 304 in which the power electronics converter 304 is transiting from the passive operation mode (OFF) into the active operation mode (ON), the controller 320 is configured to determine a second estimate 811 of the grid voltage 311, 308 based on the determined first estimate 611 of the grid voltage 311, 308 and a converter current 307 of the power electronics converter 304 being receivable by the power electronics converter 304 in the transition state 321 upon a basis of a closed control loop, e.g. a closed control loop 800 as shown in FIG. 8.

The controller 320 may be configured to determine the first estimate 611 of the grid voltage 311, 308 further based on a DC-link voltage 303 of the power electronics converter 304 in the passive operation mode of the power electronics converter 304.

Figure 6:
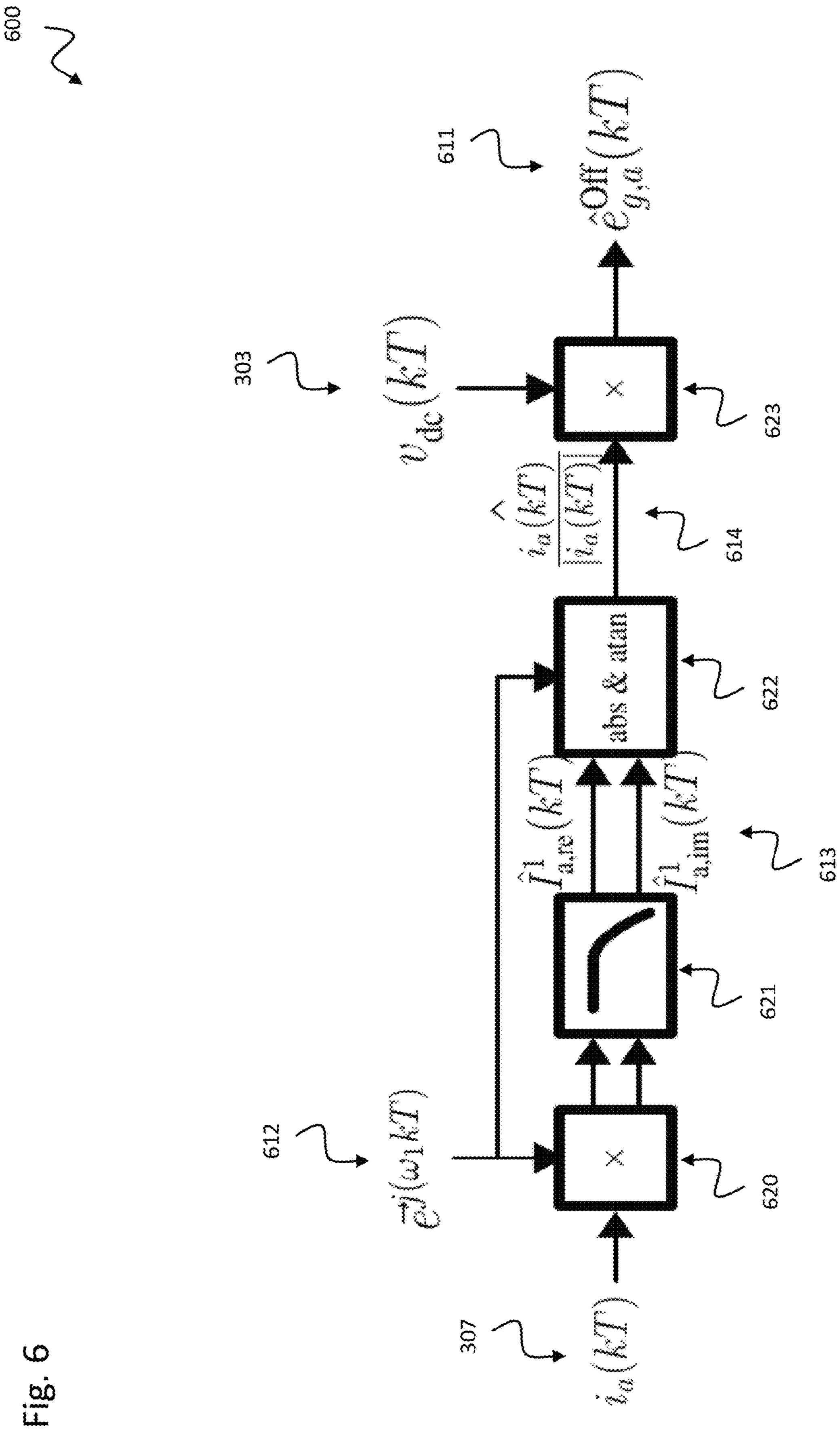
FIG. 6 shows a schematic diagram illustrating a first stage of a controller controlling a power electronics converter according to the disclosure.

The controller 320 may be configured to determine the first estimate 611 of the grid voltage 311, 308 further based on an oscillation 612 with a predefined nominal frequency of the grid voltage 311, 308, e.g. as shown in FIG. 6.

The controller 320 may be configured to determine the first estimate 611 of the grid voltage 311, 308 further based on Fourier components 613 of the converter current 307 in the transition state 321, e.g. as shown in FIG. 6.

The controller 320 may be configured to determine the first estimate 611 of the grid voltage 311, 308 based on combining the Fourier components 613 of the converter current 307 with an oscillating signal 612 with the predefined nominal frequency of the grid voltage 311, 308 as the oscillation frequency, e.g. as shown in FIG. 6.

The controller 320 may be configured to determine the first estimate 611 of the grid voltage 311, 308 based on: combining the Fourier components 613 of the converter current 307 with the oscillation signal 612 with the predefined nominal frequency of the grid voltage 311, 308 as the oscillation frequency to obtain a unitary sinusoidal 614 that is in-phase with the converter current 307; and multiplying the unitary sinusoidal 614 with the DC-link voltage 303, e.g. as shown in FIG. 6.

Figure 7:
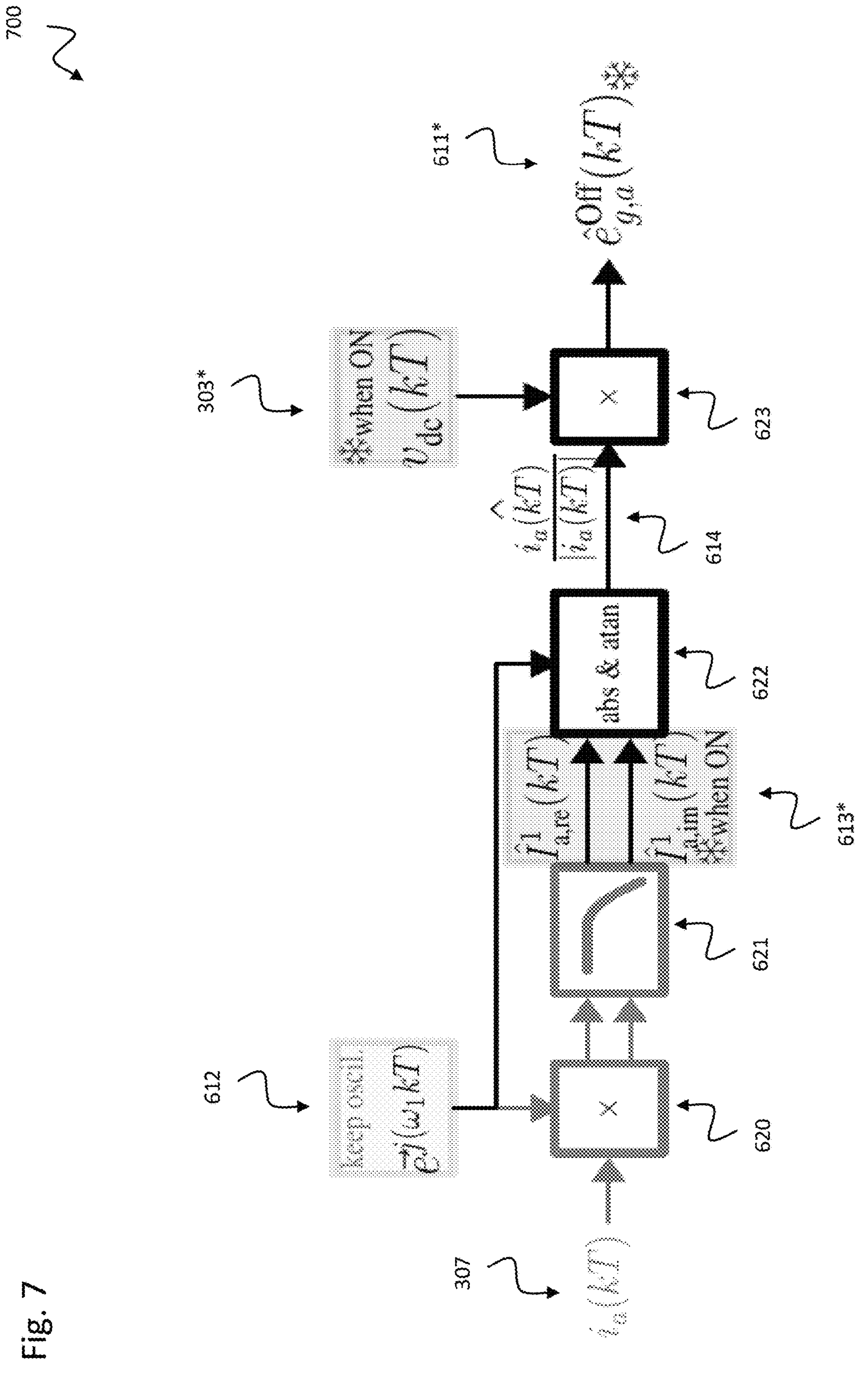
FIG. 7 shows a schematic diagram illustrating a second stage of a controller controlling a power electronics converter according to the disclosure.

The controller 320 may be configured to determine the second estimate 811 of the grid voltage 311, 308 based on an unaltered value of a DC-link voltage 303* in the transition state 321, e.g. as shown in FIG. 7.

The controller 320 may be configured to determine the second estimate 811 of the grid voltage 311, 308 based on an unaltered version of the Fourier components 613* of the converter current 307 in the transition state 321, e.g. as shown in FIG. 7.

The controller 320 may be configured to determine the second estimate 811 of the grid voltage 311, 308 based on keeping the oscillation 612 with the predefined nominal frequency of the grid voltage 311, 308 in the transition state 321 unaltered, e.g. as shown in FIG. 7.

The controller 320 may be configured to use the first estimate 611 of the grid voltage 311, 308 determined in the transition state 321 as a feedforward signal into the closed control loop 800 to enable a smooth transition 321 between the passive operation mode and the active operation mode of the power electronics converter 304, e.g. as shown in FIG. 8.

The controller 320 may be configured to determine the second estimate 811 of the grid voltage 311, 308 based on the closed control loop 800, e.g. as shown in FIG. 8, using the first estimate 611 of the grid voltage 311, 308 determined in the transition state 321 and an AC output converter voltage reference 505 being calculated by a current control loop 404 of the power electronics converter 304, e.g. as shown in FIG. 8.

The closed control loop 800 may be based on a predetermined transfer function of an impedance $Z_c$ 306 of an output filter of the power electronics converter 304 and a predetermined transfer function of an impedance $Z_g$ 310 of the electric distribution grid 309.

The first estimate 611 of the grid voltage 311, 308 and the second estimate 811 of the grid voltage 311, 308 may be estimates of a stiff grid voltage 311 of a stiff grid model of the electric distribution grid 309 or estimates of a grid voltage 308 at a connection point between the stiff grid model and the power electronics converter 304.

The power electronics converter 304 may comprise a plurality of branch cells 111*a*, 112*a*, 113*a*, e.g. as shown in FIGS. 1 and 2, configured for voltage source operation. The DC-link voltage 303 may be based on a sum of DC-link voltages of the plurality of branch cells 111*a*, 112*a*, 113*a* of the power electronics converter 304.

The converter current 307 may be a converter current of a single phase, e.g. phase 100*a* as shown in FIG. 1, of the power electronics converter 304. The first estimate 611 of the grid voltage 311, 308 and the second estimate 811 of the grid voltage 311, 308 may be estimates for the single phase 100*a* of the power electronics converter 304.

Figure 4:
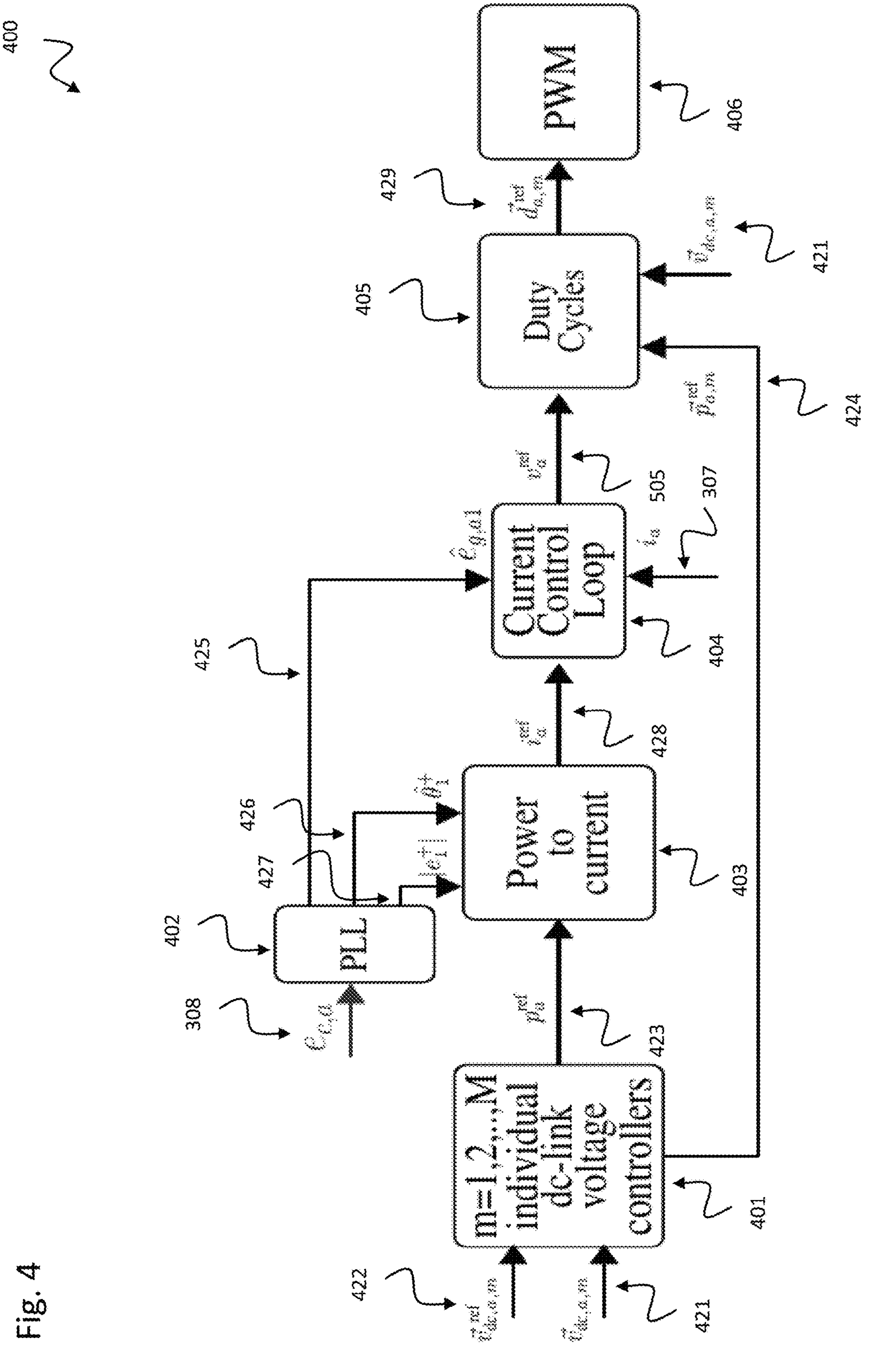
FIG. 4 shows a schematic diagram illustrating a grid-synchronization scheme relying on MV AC sensor.

FIG. 4 shows a schematic diagram illustrating a grid-synchronization circuit 400 relying on MV AC sensor.

The grid-synchronization circuit 400 comprises a number of m=1, 2, . . . , M individual DC-link voltage controllers 401, each receiving a respective DC voltage 421 and a respective DC reference voltage 422. The subscript "a" denotes phase 100*a* (see FIG. 1) while the subscript m denotes the respective branch 111*a*, 112*a*, 113*a* (see FIG. 1). The individual DC-link voltage controllers 401 provide a reference power 423 of phase (e.g. phase 100*a*) to a power-to-current circuit 403 and reference power 423 of phase 100*a* to a power-to-current circuit 403 and reference power 424 of phase and branch m to a duty cycles circuit 405.

The voltage at the connection point between converter 304 and grid 309, that is $e_{c,a}(t)$ 308, is input to a phase locked loop (PLL) 402 which provides a grid voltage estimate 425, a phase estimate 426 and an absolute voltage estimate 427 at its outputs. The grid voltage estimate 425 is provided to current control loop 404, while the phase estimate 426 and the absolute voltage estimate 427 are provided to power-to-current circuit 403 which provides a reference 428 for converter current to current control loop 404. The current control loop 404 determines a reference 505 for output phase to neutral voltage based on the values 425, 428 and the converter current 307. The reference 505 for output phase to neutral voltage is input to duty cycles circuit 405 that determines a reference 429 for the duty cycles to be applied by the PWM circuit 406. The duty cycles circuit 405 determines the reference 429 based on the reference 505 for output phase to neutral voltage, the reference power 424 of phase and branch m and the respective DC voltage 421.

Since the $e_{c,a}(t)$ measurement 308 is not used according to the concept of this disclosure described above in order to remove the costly voltage sensor, the whole control algorithm synchronization will be shifted from the approach shown in FIG. 4 to a sensorless approach as shown in FIG. 6 described in the following.

Figure 5:
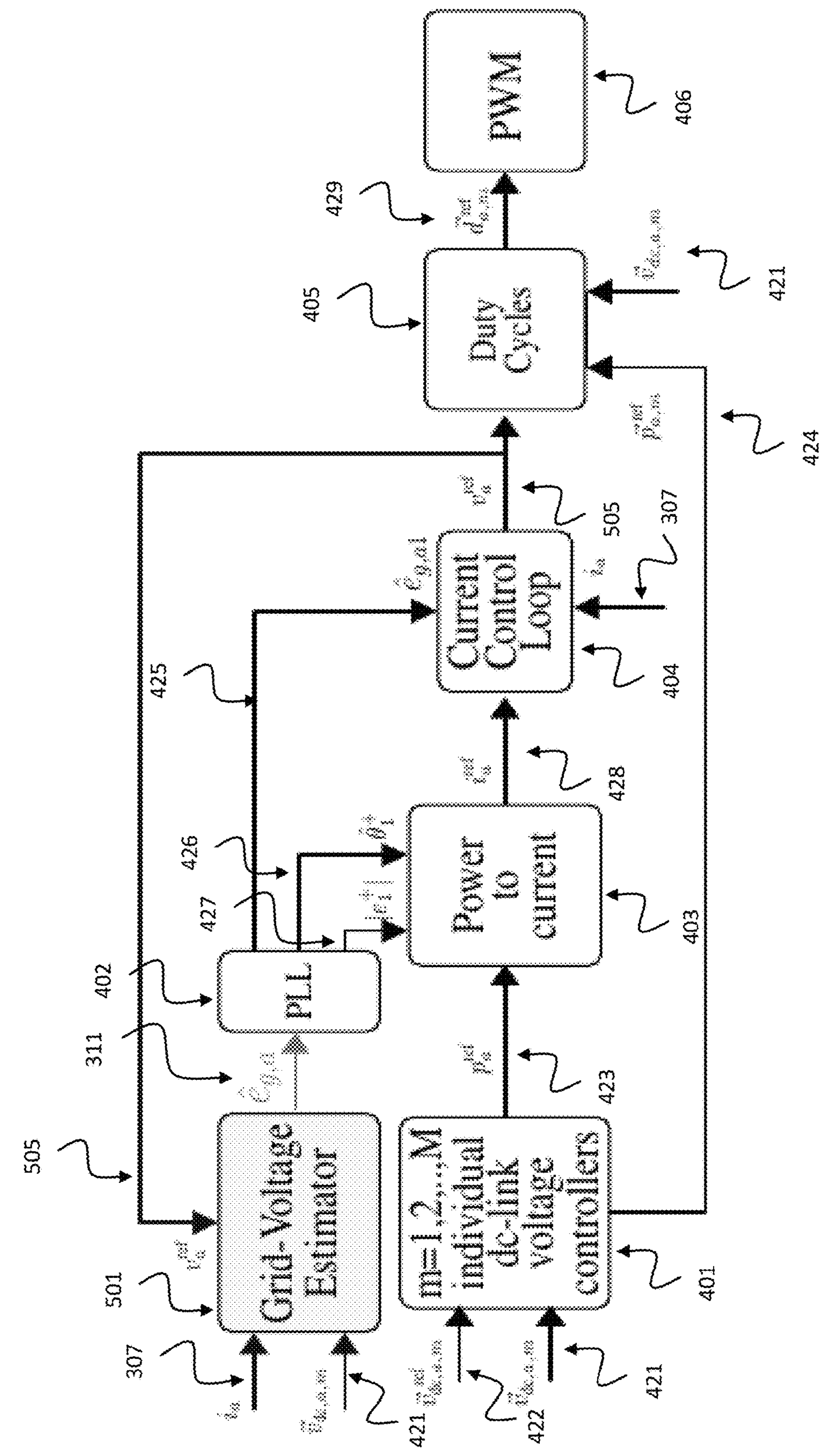
FIG. 5 shows a schematic diagram illustrating a grid-synchronization scheme according to the disclosure without the need of MV AC sensor.

FIG. 5 shows a schematic diagram illustrating a grid-synchronization circuit 500 according to the disclosure without the need of MV AC sensor. FIG. 5 illustrates the removal of a costly and complex sensor by using other available variables. It may also be stressed that current sensor for $i_a(t)$ and DC-voltage sensor(s) for $v_{dc}(t)$ are in practice less costly and better performing in the context of ISOP converters.

The grid-synchronization circuit 500 comprises the same circuit blocks as the grid-synchronization circuit 400 described above with respect to FIG. 4 but uses instead of the $e_{c,a}(t)$ measurement 308 an estimate 311 of the grid voltage (see FIG. 3). This estimate 311 is provided by a grid-voltage estimator 501 that receives the reference 505 for output phase to neutral voltage, the converter current 307 and the respective DC voltage 421 as input variables and determines the estimate 311 of the grid voltage based on these variables 505, 307, 421.

In the grid-synchronization circuit 500 of FIG. 5, the grid-voltage $e_{g,a}(t)$ 311 is estimated instead of the voltage $e_{c,a}(t)$ 308 at the connection point (see FIG. 3). The reason is that this last option may be more reasonable from a theoretical point of view: the stiff grid is a disturbance of the system and then, using it in the closed-loop systems seems less prone to create positive feedback, i.e., instability, issues. According to the model in FIG. 3, a stiff variable is estimated, i.e., a disturbance of the system, which theoretically should offer better stability properties, especially in the case of weak grid. However, in another implementation, estimation of the voltage $e_{c,a}(t)$ 308 at the connection point can be implemented as well, e.g. as described below with respect to FIG. 13.

FIG. 6 shows a schematic diagram illustrating a first stage 600 of a controller 320 controlling a power electronics converter 304 as shown in FIG. 3 according to the disclosure.

An important feature of the concept of the disclosure is to use the information of the system during the pre-charge stage: when the switches of the converter 304 are in OFF state and the system DC-link is charged through the free-wheeling diodes.

In the first stage 600, the stiff grid voltage is estimated when the PWM signals of the converter 304 are not enabled, i.e. during the pre-charge of the converter. The system works as a passive rectifier.

The digital process variables illustrated in FIG. 6 include a sampling period dependence term (kT) instead of the continuous time domain (t) shown in FIG. 3. This is to reflect the sample and hold process of digital control.

In the first stage 600 of controller 320, four processing blocks 620, 621, 622, 623 are connected with respect to each other. A multiplier 620 is used to multiply an orthogonal waveform $e^{j\omega_1 kT}$ 612 with the converter current 307 to provide inputs to a Fourier transform block 621 that calculates the Fourier components 613 of the current 307 (estimation of $I^1_{a,re}$ and $I^1_{a,im}$) at the nominal grid frequency $\omega_1$. These Fourier components 613 and the orthogonal waveform $e^{j\omega_1 kT}$ 612 is input to a processing block 622 that determines the in-phase unitary sinusoidal 614, represented by $$\frac{\hat{i_a}(kT)}{|i_a(kT)|}.$$

A second multiplier 623 multiplies the in-phase unitary sinusoidal 614 with the DC-link total voltage 303 to provide a first estimate 611 of the grid voltage in the passive operation mode, i.e. when the PWM signal of the converter is switched off. This first estimate 611 of the grid voltage corresponds to the first estimate 611 of the grid voltage 308, 311 described above with respect to FIG. 3.

The operation of the first stage 600 of controller 320 is as follows. The current through the diodes is of low power quality (a pulsating waveform, not a sinusoidal one), which in principle seems little reliable for synchronization purposes. However, by definition, the fundamental component of current should be in-phase with the grid-voltage; i.e., the converter works in unity power factor (i.e., PF=1); an intuitive way to appreciate this conjecture is the fact that the peaks on the AC voltage waveform correspond to the peaks on the current through the diodes to the DC-link.

In order to calculate a unitary vector in-phase with the AC current (and hence, also AC voltage) during the off-state, an open loop synchronization method that calculates the Fourier components 613 of the current 307 (estimation of $I^1_{a,re}$ and $I^1_{a,im}$) at the nominal grid frequency $\omega_1$ (=2π50 rads in Europe) is used. Details of this algorithm can be found in "F. D. Freijedo, J. Doval-Gandoy, O. Lopez, and C. Martinez-Penalver, "New algorithm for grid synchronization based on Fourier series," in Proc. Eur. Conf. Power Electron. Appl., Aalborg, Denmark, September 2007". The term "fundamental components" refers to components oscillating at this main grid-frequency $\omega_1$. When combining 622 the Fourier coefficients 613 with the arbitrary orthogonal waveform $e^{j\omega_1 kT}$ 612, the in-phase unitary sinusoidal 614, represented by $$\frac{\hat{i_a}(kT)}{|i_a(kT)|},$$

is obtained.

On the other hand, the DC-link total voltage 303 gives a good estimation for the amplitude of the phase-to-neutral amplitude, i.e. the amplitude of the phase-to-neutral voltage $v_a(t)$ 305 as shown in FIG. 3. This is a well-known relation for the full-wave diode rectifiers. For the ISOP topologies, it is important to mention that the DC-link total voltage 303 (per-phase) is the sum of all the individual DC-link voltages of the branch (in our case the a-phase branch 110*a* as shown in FIG. 1).

Once having the estimated amplitude and the in-phase unitary fundamental sinusoidal waveform, the stiff AC-grid voltage 611 is given when multiplying 623 both variables 303, 614.

FIG. 7 shows a schematic diagram illustrating a second stage of a controller controlling a power electronics converter according to the disclosure.

In the second stage 700, the same four processing blocks 620, 621, 622, 623 are used as in the first stage of the controller as described above with respect to FIG. 6. However, some variables are frozen, i.e. hold unchanged, as described in the following.

In the second stage 700, a smooth transition is provided from off state to on state. The on-state refers to the power converter operation with PWM switching and closed loop controls activated while the off-state refers to the power converter operation without PWM switching and deactivated closed loop controls.

The smooth transition is realized by providing a feedforward signal 611* into the on-state estimation that comes from the off-state voltage estimation. This feedforward signal 611* is set by freezing (i.e. keeping unchanged) the off-state estimation for Fourier components 613* and DC-link voltage 303*, as shown in FIG. 7. However, the off-state input oscillation 612 is kept; the reason is that feedforward signal 611*, which is a fundamental frequency sinusoidal waveform, has to be shaped in combination with the original input oscillation 612, even during on state operation.

This feedforward signal 611* corresponds to the first estimate 611 of the grid voltage described above with respect to FIG. 3 when the converter 304 is transiting from a passive operation mode to an active operation mode.

FIG. 8 shows a schematic diagram illustrating a third stage 800 of a controller 320 controlling a power electronics converter 304 according to the disclosure. When the active control of the converter 304 is activated, i.e. PWM operation is enabled, the stiff grid voltage estimation is of the form of a closed-loop observer as depicted in FIG. 8.

This third stage 800 of the controller 320 is a closed control loop 800 as described in the following. The closed control loop 800 receives the converter current 307 as input. A first adder 820 is used to subtract an output signal 826 from the converter current 307. The resulting signal is provided to a filter 821. An output of the filter 821 is added 822 to the feedforward signal 611* provided by the second stage 700 of the controller 320 described above with respect to FIG. 7. The adder 822 provides a second estimate 811 of the grid voltage corresponding to the second estimate 811 of the grid voltage described with respect to FIG. 3. A third adder 824 subtracts a reference 505 for output phase to neutral voltage as described with respect to FIG. 5, that is delayed by a delay stage 823 by one sampling period, from the second estimate 811 of the grid voltage. The output of the third adder 824 is passed to a second filter 825 that provides the output signal 826 for subtraction from the converter current 307 by the first adder 820.

The estimator circuit 800, i.e. the closed control loop 800, uses as input signals: the current measurement $i_a$(kT) 307, the AC output voltage reference $v_a^{ref}$(kT) (see FIG. 5) and the feedforward signal 611* coming from the off-state (see FIG. 7). The structure of this circuit 800 is described in detail in the documents "Patrick L. Jansen and Robert D. Lorenz, "A Physically Insightful Approach to the Design and Accuracy Assessment of Flux Observers for Field Oriented Induction Machine Drives", IEEE Transactions on Industry Applications, vol. 30, no i, January/February 1994" and "Vlatko Miskovic, Vladimir Blasko, Thomas Jahns, Robert Lorenz, Charles J. Romenesko and Haojiong Zhang, "Synchronous Frame and Resonant Adaptive Observers as Disturbance Estimators and Their Applications in Power Electronics" Proc. of the 2014 IEEE Applied Power Electronics Conference and Exposition (APEC)".

Transfer functions for the grid and converter impedances $Z_g(\omega)$ 310 and $Z_c(\omega)$ 306, as shown in FIG. 3, are needed to be implemented in order to determine the transfer function 825. FIG. 8 shows a combination of these two variables expressed in Z-domain variables, which is the standard representation in digital implementations. In principle, an accurate estimation for $Z_g(z)$ and $Z_c(z)$ can be assumed for most of the particular cases. Installation of MV grid connected converters usually requires grid-mode studies that will provide an analytical description for $Z_g(\omega)$ as a transfer function, i.e., $Z_g(z)$; much easier is to know $Z_c(\omega)$ since it is a design parameter of the converter.

Figure 9:
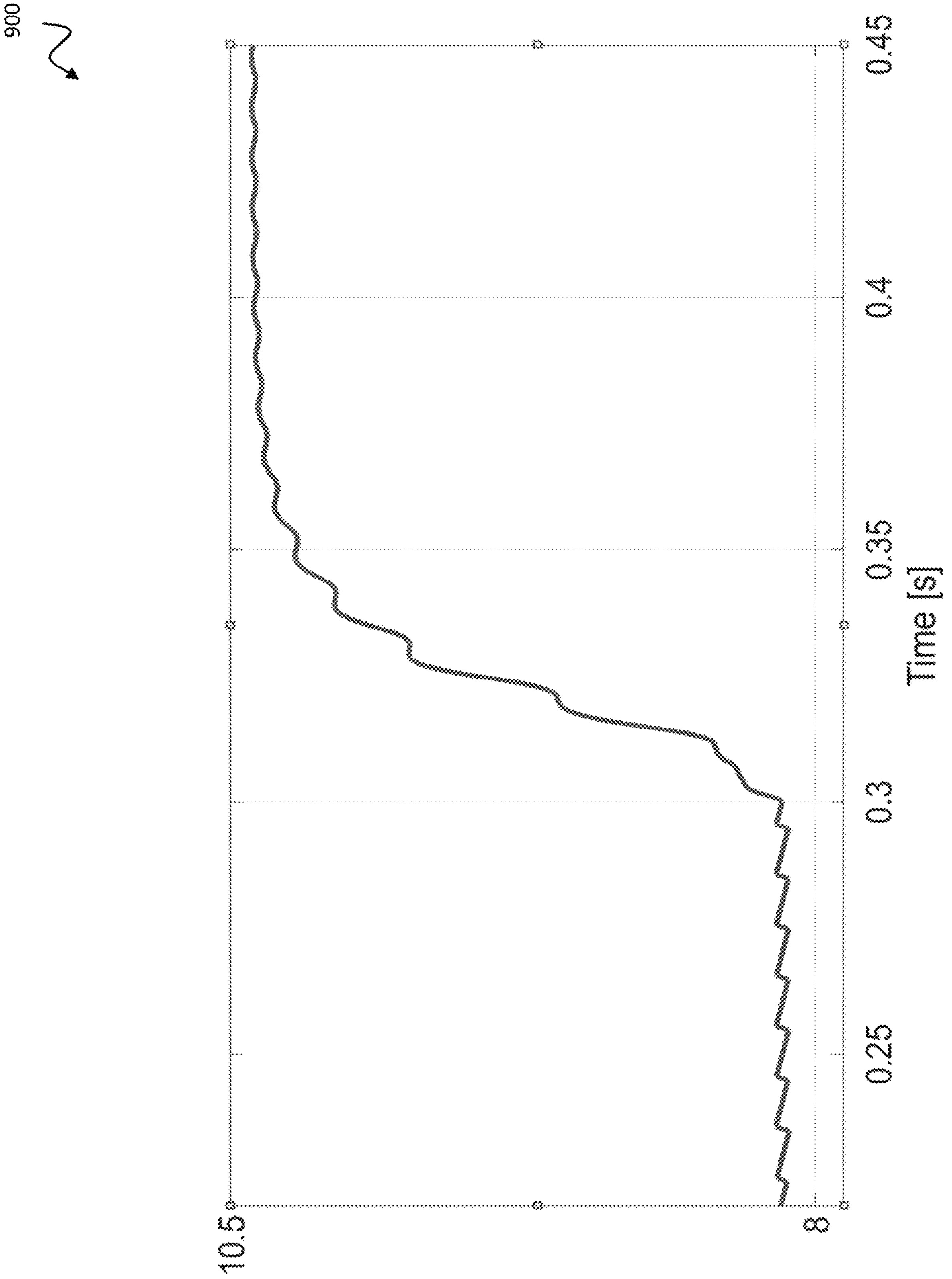
FIG. 9 shows a schematic diagram illustrating a total DC-link voltage of the Cascaded H-Bridge (CHB) converter of FIG. 1 for a transition of the converter from off to on state at 0.3 s.

FIG. 9 shows a schematic diagram illustrating a total DC-link voltage 900 of the Cascaded H-Bridge (CHB) converter 110 shown in FIGS. 1 and 2 for a transition of the converter from off to on state at 0.3 s.

The implementation presented in this disclosure was tested in a single-phase converter that interfaces the AC grid with a cascaded H-bridge of 7 UPFC cells (see FIGS. 1 and 2, but considering only one of the phases, e.g., phase 'a' and a single-phase version of FIG. 2). A time-domain simulation, using PLECS software, was used as numeric method to get the results.

With respect to FIG. 3, the values of the simulation are given in Table 1 below. For the sake of simplicity, both impedances are purely inductive (capacitive/resistive behaviours in the plant are overlooked). According to the data in the table, the short-circuit which gives a SCR of 2, which will be reflected on PWM distortion of the voltage in the theoretical measurement point (see FIGS. 11 and 12).

TABLE 1 values of the time-domain simulation of the single-phase converter 110a shown in FIGS. 1 and 2

| | |
|---|---|
| Phase-neutral RMS/peak voltages | 5.77/8.16 kV |
| Converter inductance | 5 mH |
| Grid inductance | 2.5 mH |
| Power Consumption | 400 W (very light load) |

FIG. 9 shows the DC-link voltage of the simulation, corresponding to the DC-link voltage 303 shown in FIG. 3. The transition from OFF-state to ON-state is at 0.3 s: the DC-link has a transition from the value that corresponds to the passive operation to the value achieved by closed-loop operation. The first one, which in the simulation is slightly above 8 kV, broadly corresponds to the phase-neutral peak voltage (voltage drops in the pre-charge resistance are neglected in this assumption), and hence is a good estimation for the grid-voltage amplitude, as explained above with respect to FIG. 6 for the first stage 600 of the controller 320. The steady-state value achieved during closed loop operation (close to 10.5 kV in this simulation) depends on the commanded reference value.

Figure 10:
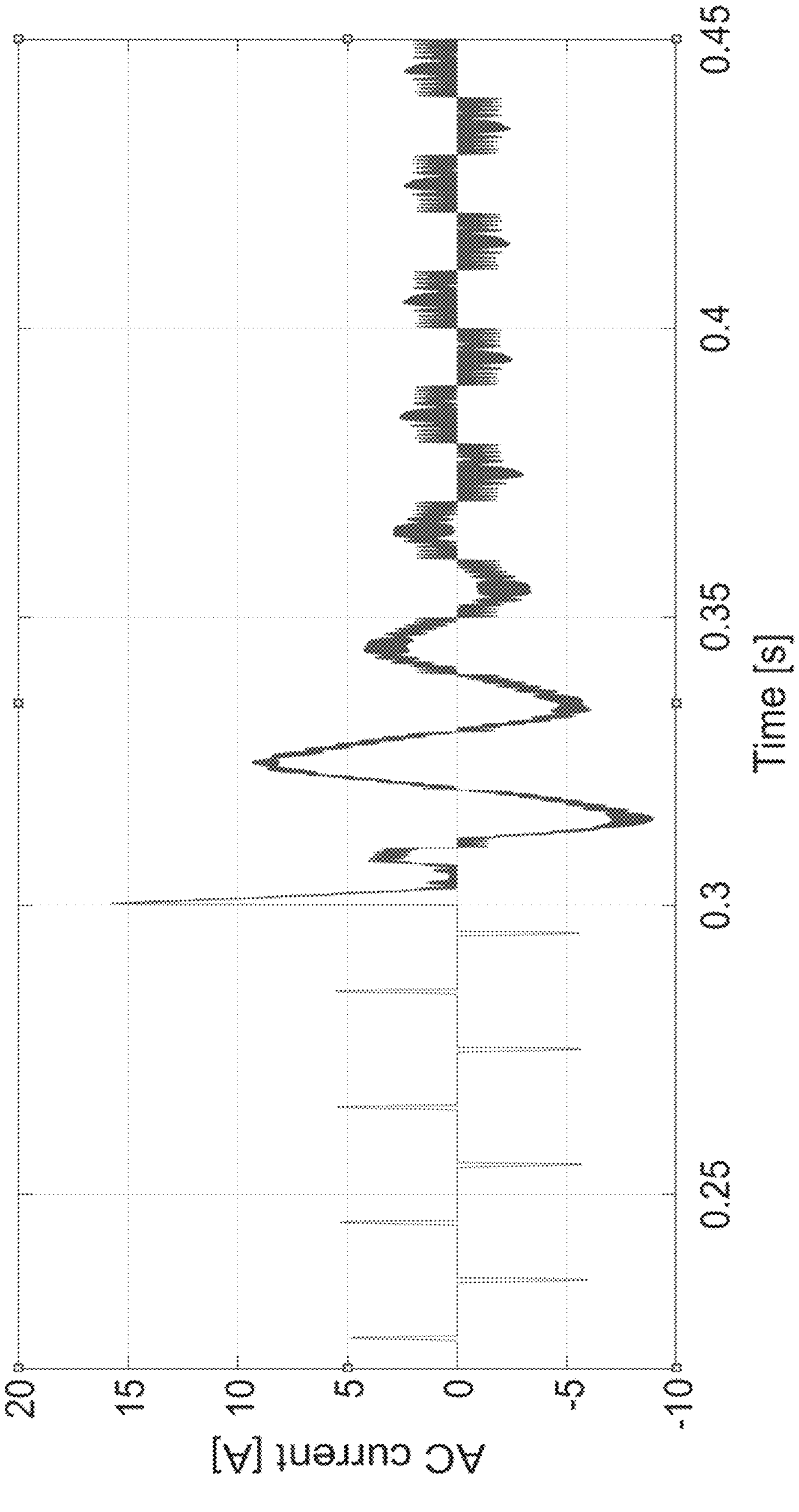
FIG. 10 shows a schematic diagram illustrating an AC current of the Cascaded H-Bridge (CHB) converter of FIG. 1 for a transition of the converter from off to on state at 0.3 s.

FIG. 10 shows a schematic diagram illustrating an AC current 1000 of the Cascaded H-Bridge (CHB) converter of FIGS. 1 and 2 for a transition of the converter from off to on state at 0.3 s.

FIG. 10 shows the current during the process described above. The current before activation of PWM signals and closed loop main control is pulsating, as explained above with respect to FIG. 6 for the first stage 600 of the controller 320. Then, at 0.3 s the curves correspond to the closed-loop operation: the PWM operation is clear. The steady-state corresponds to a very low current consumption, due to the light load operation simulated.

Figure 11:
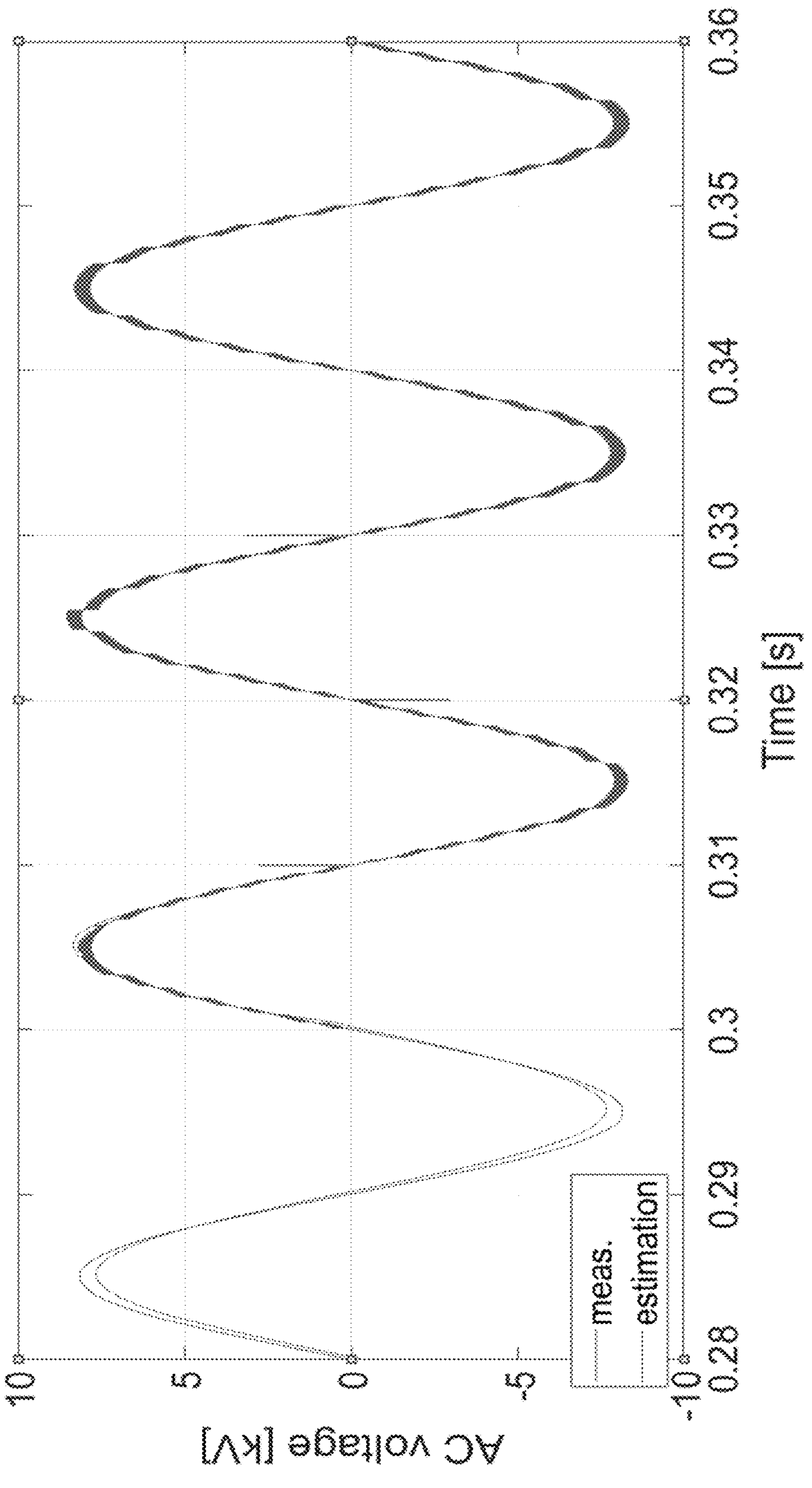
FIG. 11 shows a schematic diagram illustrating an AC voltage of the Cascaded H-Bridge (CHB) converter of FIG. 1 at the connection point between the converter and the grid for a transition of the converter from off to on state at 0.3 s.

FIG. 11 shows a schematic diagram illustrating an AC voltage 1100 of the Cascaded H-Bridge (CHB) converter of FIGS. 1 and 2 at the connection point between the converter and the grid for a transition of the converter from off to on state at 0.3 s.

With reference to FIG. 1, the estimated value for the AC voltage of the stiff grid $\hat{e}_{g,a}(kT)$ (see also FIG. 3) is represented together the measured value $e_{c,a}(t)$ 308, that is easily available in the simulation, but to be removed in the real converter. The transition from OFF state to ON state shows how the estimation is accurate before and after the converter operation.

Figure 12:
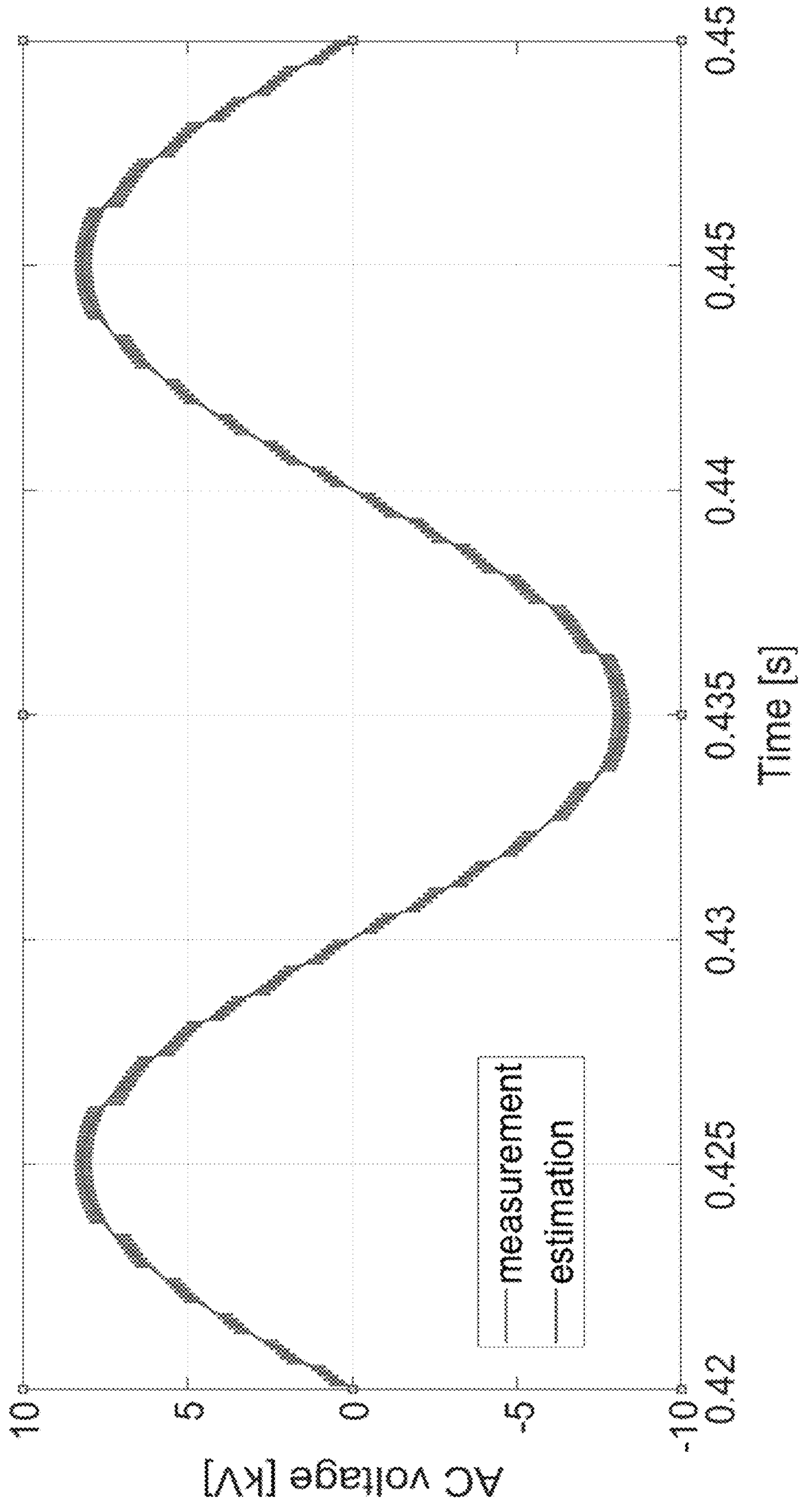
FIG. 12 shows a schematic diagram illustrating the AC voltage of the Cascaded H-Bridge (CHB) converter of FIG. 1 in the steady-state operation of the converter.

FIG. 12 shows a schematic diagram illustrating the AC voltage 1200 of the Cascaded H-Bridge (CHB) converter of FIGS. 1 and 2 in the steady-state operation of the converter.

The steady-state operation and the very good feature of filtering the noise is detailed in FIG. 12. It can be said that $\hat{e}_{g,a}(kT)$ is able to provide an accurate estimation for the fundamental component of the stiff grid and rejects the PWM noise that appears due to the weak grid operation.

Figure 13:
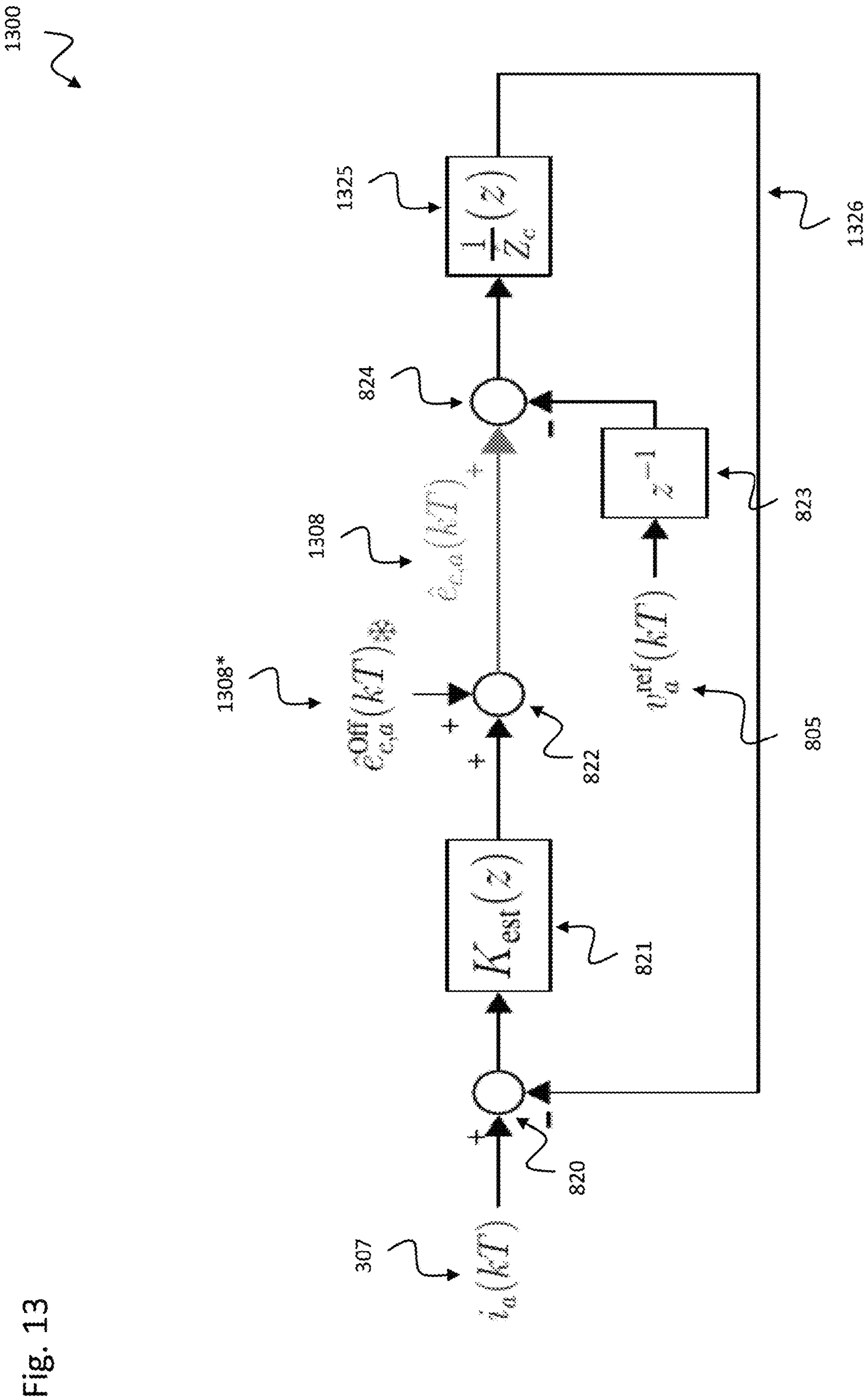
FIG. 13 shows a schematic diagram illustrating a third stage of a controller controlling a power electronics converter according to the disclosure when the voltage at the connection point between the converter and the grid is estimated instead of the stiff grid voltage.

FIG. 13 shows a schematic diagram illustrating a third stage of a controller controlling a power electronics converter according to the disclosure when the voltage 308 at the connection point between the converter 304 and the grid 309 is estimated instead of the stiff grid voltage 311.

When the active control of the converter 304 is activated, i.e. PWM operation is enabled, the estimation of the voltage 308 at the connection point between the converter 304 and the grid 309 is of the form of a closed-loop observer as depicted in FIG. 13.

This third stage 1300 of the controller 320 is a closed control loop 1300 that corresponds to the closed loop control 800 depicted in FIG. 8 with the difference that the estimate for the voltage 1308* at the connection point between the converter 304 and the grid 309 is used as input instead of the estimate of the stiff grid voltage 611* depicted in FIG. 8. The second transfer function 1325 is different from the second transfer function 825 shown in FIG. 8. It uses only the transfer function for the converter impedance $Z_c(\omega)$ 306, as shown in FIG. 3 to provide the output signal 1326 that is subtracted from the converter current 307.

The estimator circuit 1300, i.e. the closed control loop 1300, uses as input signals: the current measurement $i_a(kT)$ 307, the AC output voltage reference $v_a^{ref}(kT)$ 505 (see FIG. 5) and the feedforward signal 611* coming from the off-state (see FIG. 7) which is now calculated from the stiff grid voltage. The structure of this circuit 1300 corresponds to the structure and functionality of the circuit 800 described above with respect to FIG. 8.

The disclosed idea can be applied in any physical system that can be represented by FIG. 3. This includes any number of phases of the AC grid (typically 1 or 3 seem the most relevant). In case of multilevel converters, the number of cells, or the circuit of each cells are well represented by FIG. 3. Simplest converter solutions such as 2 level converters are also covered by FIG. 3.

In the case of multiphase systems, with explicit mention to three-phase systems, estimation can be made using per-phase variables (i.e., one estimation per-phase) or using the variables obtained by Clarke or Park transformations. In other words, the change of reference frame (i.e., the use of alpha/beta or dq variables which is very widely adopted in control of power electronics systems) is not changing the nature of the solution (physical laws, and hence estimator plant, are the same irrespectively from using Clarke or Park transformations).

In the case of multiphase systems with common DC-link shared among phases (e.g., a neutral point clamped converter structure), the DC-link voltage during the off-state estimation provides amplitude estimation for the line to line peak voltage (instead of phase-neutral).

The nominal grid frequency $\omega_1$ can be considered as a known, i.e. predefined constant parameter, e.g., $\omega_1=2\pi 50$ rad/s in Europe. Considering frequency drifts, this parameter becomes time dependent. In practice, this parameter is rarely shifted by more than 2% of the nominal value and hence, for the sake of simplicity, it can be considered constant for the enclosure discussion. However, using real frequency estimations, available from the PLL, could be considered as well. When the closed-loop control is activated, frequency tracking from the PLL is available and can be used to modify the OFF state estimation.

Figure 14:
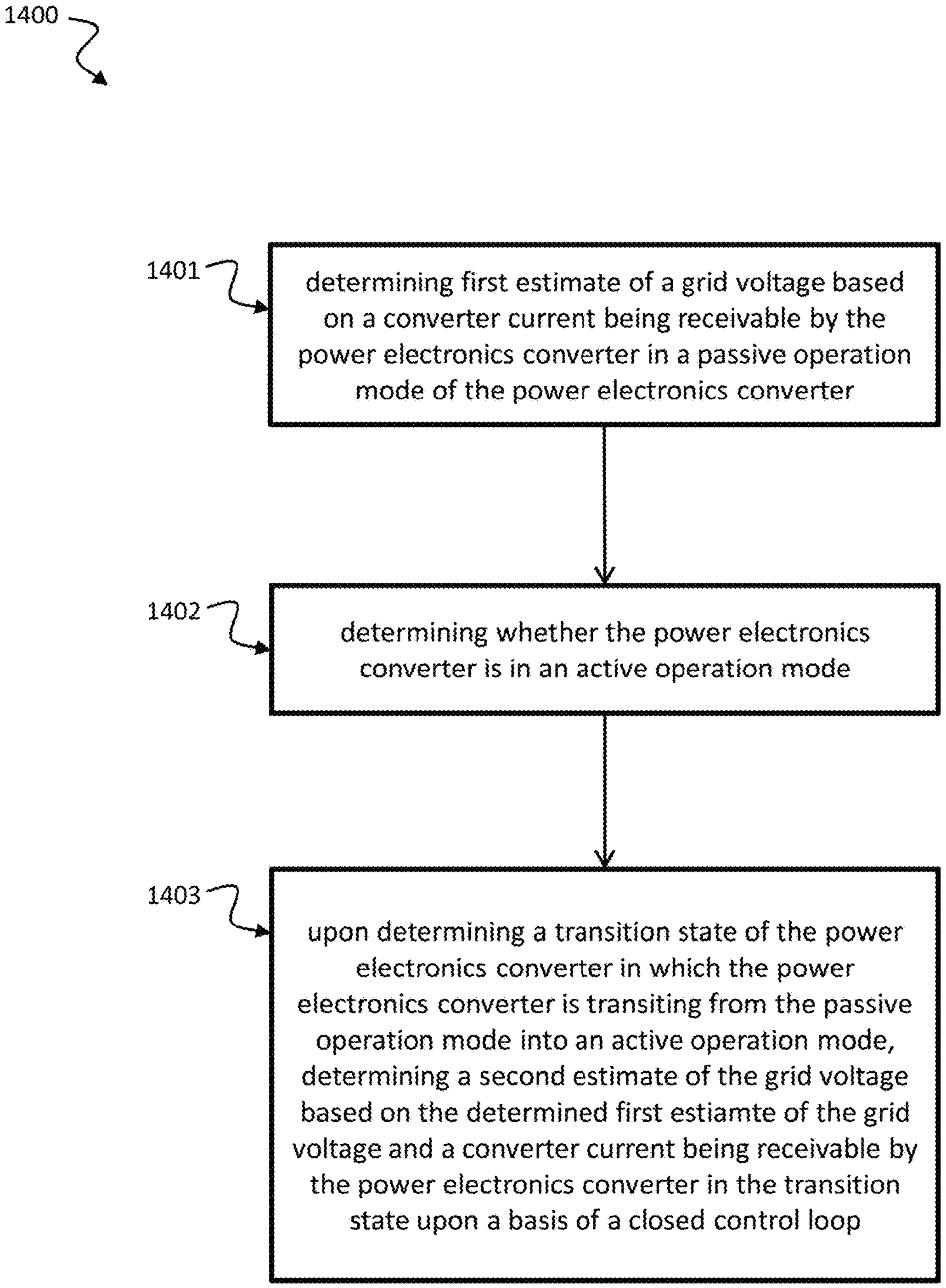
FIG. 14 shows a schematic diagram illustrating a method for controlling a power electronics converter in an electric distribution network according to the disclosure.

FIG. 14 shows a schematic diagram illustrating a method 1400 for controlling a power electronics converter in an electric distribution grid for distributing electrical energy, e.g. as shown in FIG. 3, according to the disclosure.

The method 1400 comprises: determining 1401 a first estimate of a grid voltage based on a converter current of the power electronics converter being receivable by the power electronics converter in a passive operation mode of the power electronics converter, e.g. as described above with respect to FIGS. 3 to 13.

The method 1400 comprises: determining 1402 whether the power electronics converter is in an active (ON) or passive (OFF) operation mode, e.g. as described above with respect to FIGS. 3 to 13.

The method 1400 comprises: wherein, upon determining 1403 a transition state of the power electronics converter in which the power electronics converter is transiting from the passive operation mode into the active operation mode, determining a second estimate of the grid voltage based on the determined first estimate of the grid voltage and a converter current of the power electronics converter being receivable by the power electronics converter in the transition state upon a basis of a closed control loop, e.g. as described above with respect to FIGS. 3 to 13.

While a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms “include”, “have”, “with”, or other variants thereof are used in either the detailed description or the claims, such terms are intended to be inclusive in a manner similar to the term “comprise”. Also, the terms “exemplary”, “for example” and “e.g.” are merely meant as an example, rather than the best or optimal. The terms “coupled” and “connected”, along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the invention beyond those described herein. While the present disclosure refers to one or more particular embodiments, those skilled in the art recognize that many changes may be made thereto without departing from the scope of the present invention. It is therefore to be understood that within the scope of the appended claims and their equivalents, the invention may be practiced otherwise than as specifically described herein.

What is claimed is:

1. A controller for controlling a power electronics converter in an electric distribution grid for distributing electrical energy, the controller comprising:

processing circuitry configured to:

determine a first estimate of a grid voltage based on a converter current of the power electronics converter capable of being received by the power electronics converter in a passive operation mode;

determine an operation mode of the power electronics converter, and determine, based on determining a transition state of the power electronics converter in which the power electronics converter is transiting from a passive operation mode into an active operation mode, a second estimate of the grid voltage, the second estimate of the grid voltage being based on the determined first estimate of the grid voltage and a converter current capable of being received by the power electronics converter in the transition state upon a basis of a closed control loop.

2. The controller of claim 1, wherein the processing circuitry is configured to determine the first estimate of the grid voltage based on a DC-link voltage of the power electronics converter in the passive operation mode of the power electronics converter.

3. The controller of claim 2, wherein the processing circuitry is configured to determine the first estimate of the grid voltage based on an oscillation with a predefined nominal frequency of the grid voltage.

4. The controller of claim 3, wherein the processing circuitry is configured to determine the first estimate of the grid voltage based on Fourier components of the converter current in the transition state.

5. The controller of claim 4, wherein the processing circuitry is configured to determine the first estimate of the grid voltage based on combining the Fourier components of the converter current with an oscillating signal with the predefined nominal frequency of the grid voltage as the oscillation frequency.

6. The controller of claim 5, wherein the processing circuitry is configured to determine the first estimate of the grid voltage based on combining the Fourier components of the converter current with the oscillating signal with the predefined nominal frequency of the grid voltage as the oscillation frequency to obtain a unitary sinusoid that is in-phase with the converter current; and multiply the unitary sinusoid with the DC-link voltage.

7. The controller of claim 4, wherein the processing circuitry is configured to determine the second estimate of the grid voltage based on a value of a DC-link voltage in the transition state.

8. The controller of claim 4, wherein the processing circuitry is configured to determine the second estimate of the grid voltage based on an unaltered version of the Fourier components of the converter current in the transition state.

9. The controller of claim 3, wherein the processing circuitry is configured to determine the second estimate of the grid voltage based on keeping the oscillation with the predefined nominal frequency of the grid voltage in the transition state.

10. The controller of claim 1, wherein the processing circuitry is further configured to use the first estimate of the grid voltage determined in the transition state as a feedforward signal into the closed control loop to enable a smooth transition between the passive operation mode and the active operation mode of the power electronics converter.

11. The controller of claim 1, wherein the processing circuitry is configured to determine the second estimate of the grid voltage based on the closed control loop using the first estimate of the grid voltage determined in the transition state and an AC output converter voltage reference being calculated by a current control loop of the power electronics converter.

12. The controller of claim 1, wherein the closed control loop is based on a predetermined transfer function of an impedance of an output filter of the power electronics converter and a predetermined transfer function of an impedance of the electric distribution grid.

13. The controller of claim 1, wherein the first estimate of the grid voltage and the second estimate of the grid voltage are estimates of a stiff grid voltage of a stiff grid model of the electric distribution grid or estimates of a grid voltage at a connection point between the stiff grid model and the power electronics converter.

14. The controller of claim 2, wherein the power electronics converter comprises a plurality of branch cells configured for voltage source operation, and wherein the DC-link voltage is based on a sum of DC-link voltages of the plurality of branch cells of the power electronics converter.

15. The controller of claim 1, wherein the converter current is a converter current of a single phase of the power electronics converter; and wherein the first estimate of the grid voltage and the second estimate of the grid voltage are estimates for the single phase of the power electronics converter.

16. A method for controlling a power electronics converter in an electric distribution grid for distributing electrical energy, the method comprising:

determining a first estimate of a grid voltage based on a converter current of the power electronics converter that the power electronics converter is capable of receiving in a passive operation mode;

determining an operation mode of the power electronics converter, and wherein, upon determining a transition state of the power electronics converter in which the power electronics converter is transiting from the passive operation mode into the active operation mode, determining a second estimate of the grid voltage based on the determined first estimate of the grid voltage and a converter current of the power electronics converter capable of being received by the power electronics converter in the transition state upon a basis of a closed control loop.

* * * * *